US011907973B2

(12) United States Patent
Nolet et al.

(10) Patent No.: US 11,907,973 B2
(45) Date of Patent: Feb. 20, 2024

(54) ADVERTISING PLATFORM TRANSACTION MANAGEMENT

(71) Applicant: Microsoft Technology Licensing, LLC, Redmond, WA (US)

(72) Inventors: Michiel Nolet, New York, NY (US); Charles Brian O'Kelley, New York, NY (US); Andrew S. Dilling, New York, NY (US); Frederick Bou-Hsuen Lu, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/513,688

(22) Filed: Oct. 28, 2021

(65) Prior Publication Data

US 2022/0051295 A1    Feb. 17, 2022

Related U.S. Application Data

(63) Continuation of application No. 16/299,985, filed on Mar. 12, 2019, now Pat. No. 11,188,951, which is a
(Continued)

(51) Int. Cl.
*G06Q 30/00* (2012.01)
*G06Q 30/0251* (2023.01)
(Continued)

(52) U.S. Cl.
CPC ......... *G06Q 30/0269* (2013.01); *G06Q 30/02* (2013.01); *G06Q 30/0251* (2013.01);
(Continued)

(58) Field of Classification Search
CPC .............................. G06Q 30/024; G06Q 30/02
See application file for complete search history.

(56) References Cited

U.S. PATENT DOCUMENTS 5,855,008 A    12/1998    Goldhaber et al.
5,974,398 A    10/1999    Hanson et al.
(Continued)

FOREIGN PATENT DOCUMENTS

EP    1262891 A1    12/2002
WO    0135291 A2    5/2001
(Continued)

OTHER PUBLICATIONS

International Search Report & Written Opinion for PCT/US2013/052715 dated Apr. 14, 2014.
(Continued)

*Primary Examiner* — Alvin L Brown
(74) *Attorney, Agent, or Firm* — Calfee, Halter & Griswold LLP

(57) ABSTRACT

A computer-implemented method includes generating, using a transaction management computing subsystem of an advertising platform, a set of primary bid requests responsive to receipt of an advertising call. Each primary bid request includes information sufficient to characterize an impression consumer and information sufficient to characterize each of one or more impressions identified in the advertising call. The method also includes sending the set of primary bid requests from the transaction management computing subsystem to a first set of decisioning computing subsystems of the advertising platform. Each decisioning computing subsystem of the first set being operable to generate a bid response based on the information included in a primary bid request. The method further includes selecting, using the transaction management computing subsystem, a first bid response from among the bid responses generated by the first set of decisioning computing subsystems; and taking, by the transaction management computing subsystem, an action on the first bid response.

20 Claims, 9 Drawing Sheets

Related U.S. Application Data continuation of application No. 12/718,000, filed on Mar. 5, 2010, now Pat. No. 10,262,337.

(60) Provisional application No. 61/158,073, filed on Mar. 6, 2009.

(51) Int. Cl.
  *G06Q 30/02* (2023.01)
  *G06Q 30/0273* (2023.01)
  *G06Q 30/0241* (2023.01)

(52) U.S. Cl.
  CPC ..... *G06Q 30/0255* (2013.01); *G06Q 30/0275* (2013.01); *G06Q 30/0276* (2013.01)

(56) References Cited

U.S. PATENT DOCUMENTS

| | | |
|---|---|---|
| 6,285,987 B1 | 9/2001 | Roth et al. |
| 6,324,519 B1 | 11/2001 | Eldering |
| 6,760,916 B2 | 7/2004 | Hotz |
| 7,231,358 B2 | 6/2007 | Singh et al. |
| 7,676,405 B2 | 3/2010 | Steelberg et al. |
| 7,761,346 B2 | 7/2010 | Cooper et al. |
| 7,835,939 B1 | 11/2010 | Karlsson |
| 7,870,023 B2 | 1/2011 | Ozer et al. |
| 8,099,326 B2 | 1/2012 | Steelberg et al. |
| 8,135,626 B2 | 3/2012 | Das et al. |
| 8,175,914 B1 | 5/2012 | Benson et al. |
| 8,224,698 B2 | 7/2012 | Libby et al. |
| 8,271,325 B2 | 9/2012 | Silverman et al. |
| 8,296,179 B1 | 10/2012 | Rennison |
| 8,516,515 B2 | 8/2013 | Zigmond et al. |
| 8,554,876 B2 | 10/2013 | Winsor et al. |
| 8,738,436 B2 | 5/2014 | Tuladhar et al. |
| 8,775,391 B2 | 7/2014 | Kalavade |
| 2001/0047290 A1 | 11/2001 | Petras et al. |
| 2002/0169760 A1 | 11/2002 | Cheung et al. |
| 2003/0046161 A1 | 3/2003 | Kamangar et al. |
| 2003/0110171 A1 | 6/2003 | Ozer et al. |
| 2004/0006606 A1 | 1/2004 | Marotta et al. |
| 2004/0088363 A1 | 5/2004 | Doemling et al. |
| 2004/0103024 A1 | 5/2004 | Patel et al. |
| 2005/0028188 A1 | 2/2005 | Latona et al. |
| 2005/0187818 A1 | 8/2005 | Zito et al. |
| 2005/0251444 A1 | 11/2005 | Varian et al. |
| 2006/0069613 A1 | 3/2006 | Marquardt |
| 2006/0069621 A1 | 3/2006 | Chang et al. |
| 2006/0224496 A1 | 10/2006 | Sandholm et al. |
| 2007/0005417 A1 | 1/2007 | Desikan et al. |
| 2007/0073584 A1 | 3/2007 | Grouf et al. |
| 2007/0083885 A1 | 4/2007 | Harding |
| 2007/0088609 A1 | 4/2007 | Reller et al. |
| 2007/0130005 A1 | 6/2007 | Jaschke |
| 2007/0150348 A1 | 6/2007 | Hussain et al. |
| 2007/0156621 A1 | 7/2007 | Wright et al. |
| 2007/0179849 A1 | 8/2007 | Jain |
| 2007/0233566 A1 | 10/2007 | Zlotin et al. |
| 2007/0260514 A1 | 11/2007 | Burdick et al. |
| 2007/0288350 A1 | 12/2007 | Bykowsky |
| 2008/0097838 A1 | 4/2008 | Lin et al. |
| 2008/0147497 A1 | 6/2008 | Tischer |
| 2008/0147682 A1 | 6/2008 | O'Kelley et al. |
| 2008/0162329 A1 | 7/2008 | Knapp et al. |
| 2008/0167924 A1 | 7/2008 | Veach |
| 2008/0228564 A1 | 9/2008 | De et al. |
| 2008/0249834 A1 | 10/2008 | Zigmond et al. |
| 2008/0262912 A1 | 10/2008 | Gargi |
| 2008/0262917 A1 | 10/2008 | Green et al. |
| 2008/0275757 A1 | 11/2008 | Sharma et al. |
| 2009/0030788 A1 | 1/2009 | Boudah et al. |
| 2009/0210287 A1 | 8/2009 | Chickering et al. |
| 2009/0327032 A1 | 12/2009 | Gunawardana et al. |
| 2010/0017287 A1 | 1/2010 | Caldwell et al. |
| 2010/0049695 A2 | 2/2010 | Morsa |
| 2010/0082433 A1 | 4/2010 | Zhou et al. |
| 2010/0125506 A1 | 5/2010 | Vassilvitskii et al. |
| 2010/0145809 A1 | 6/2010 | Knapp et al. |
| 2010/0228635 A1 | 9/2010 | Ghosh et al. |
| 2010/0235219 A1 | 9/2010 | Merrick et al. |
| 2011/0087694 A1 | 4/2011 | Haugen et al. |
| 2011/0161157 A1 | 6/2011 | Nam et al. |
| 2011/0231242 A1 | 9/2011 | Dilling et al. |
| 2014/0149232 A1 | 5/2014 | Ringdahl |
| 2014/0229295 A1 | 8/2014 | Paunikar et al. |
| 2015/0234839 A1 | 8/2015 | Ho et al. |
| 2015/0235275 A1 | 8/2015 | Shah et al. |
| 2019/0213643 A1 | 7/2019 | Nolet et al. |

FOREIGN PATENT DOCUMENTS

| | | |
|---|---|---|
| WO | 2006096768 A2 | 9/2006 |
| WO | 2008045533 A2 | 4/2008 |
| WO | 2008077078 A1 | 6/2008 |
| WO | 2009029815 A2 | 3/2009 |

OTHER PUBLICATIONS

Supplementary EP Search Report for EP11756897 dated Jan. 22, 2014, 2 pgs.
"AppNexus Delivers Data Warehouse Cloud Service Based on Netezza", http://www.netezza.com/releases/2009/release020209.htm, Feb. 2, 2009.
"European Search Report", GB Application No. 1003744.8, dated Mar. 5, 2010, 1 page.
"International Search Report and Written Opinion", PCT/US2011/028600, dated Jul. 20, 2011, 11 pages.
"International Search Report and Written Opinion", PCT/US2013/052715, dated Apr. 14, 2014, 4 pages.
"Supplementary European Search Report", European Application No. EP11756897, dated Jan. 22, 2014, 2 pages.
"Office Action Issued in United Kingdom Patent Application No. 1003744.8", dated Dec. 1, 2014, 7 Pages.
"Office Action Issued in United Kingdom Patent Application No. 1003744.8", dated Sep. 14, 2015, 9 Pages.
"Office Action Issued in United Kingdom Patent Application No. 1506924.8", dated Jan. 21, 2016, 6 Pages.
"Office Action Issued in United Kingdom Patent Application No. 1506924.8", dated Sep. 1, 2015, 9 Pages.
"Office Action Issued in United Kingdom Patent Application No. 1506928.9", dated Sep. 14, 2015, 10 Pages.
"Office Action Issued in United Kingdom Patent Application No. 1506928.9", dated Jan. 21, 2016, 2 Pages.
"Office Action Issued in United Kingdom Patent Application No. 1506929.7", dated Jul. 31, 2015, 10 Pages.
"Office Action Issued in United Kingdom Patent Application No. 1506929.7", dated Jan. 21, 2016, 7 Pages.
"Office Action Issued in United Kingdom Patent Application No. 1506931.3", dated Jan. 21, 2016, 7 Pages.
"Office Action Issued in United Kingdom Patent Application No. 1506931.3", dated Sep. 1, 2015, 9 Pages.
"Office Action Issued in United Kingdom Patent Application No. 1506932.1", dated Jan. 21, 2016, 6 Pages.
"Office Action Issued in United Kingdom Patent Application No. 1506932.1", dated Aug. 17, 2015, 8 Pages.

ADVERTISING PLATFORM TRANSACTION MANAGEMENT

CROSS REFERENCE TO RELATED APPLICATIONS

This application is a continuation of U.S. application Ser. No. 16/299,985, filed Mar. 12, 2019, which is a continuation of U.S. application Ser. No. 12/718,000, filed Mar. 5, 2010, now U.S. Pat. No. 10,262,337, which claims the benefit of U.S. Provisional Application No. 61/158,073, filed Mar. 6, 2009. All sections of the aforementioned application(s) and/or patent(s) are incorporated herein by reference in their entirety.

FIELD OF THE DISCLOSURE

The subject disclosure relates to advertising platform transaction management.

BACKGROUND

This description relates to a computer system, and in particular a computer system for providing an advertising platform.

One of the major challenges within the online advertising market is the massive fragmentation of companies, services, and technology providers. A significant lack of standards among the mix of technologies and disparate data centers makes integration between parties difficult, if not impossible.

More and more, the buying and selling of online or world wide web display advertising is moving from a "bulk impression" model to a "user specific" buying model where specific advertising is generated for a specific user or impression consumer. Agencies, networks, and publishers are getting smarter about which specific users are valuable for a given campaign; advertisers now require more and more flexible buying mechanisms to reach those specific users. Today's mechanisms require bulk purchasing based on some coarse targeting parameters. Current attempts at deeper integration between user data and the impression buyer generally involve some level of HTTP redirects which bounce a user back and forth between various serving systems. This makes the process very slow. This adversely affects an impression consumers experience of a website and has an impact on the effectiveness of advertising included in a website.

SUMMARY

In a general aspect, a computer-implemented method includes generating, using a transaction management computing subsystem of an advertising platform, a set of primary bid requests responsive to receipt of an advertising call, each primary bid request including information sufficient to characterize an impression consumer and information sufficient to characterize each of one or more impressions identified in the advertising call. The method also includes sending the set of primary bid requests from the transaction management computing subsystem to a first set of decisioning computing subsystems of the advertising platform, each decisioning computing subsystem of the first set being operable to generate a bid response based on the information included in a primary bid request. The method further includes selecting, using the transaction management computing subsystem, a first bid response from among the bid responses generated by the first set of decisioning computing subsystems; and taking, by the transaction management computing subsystem, an action on the first bid response.

Embodiments may include one or more of the following.

Generating each primary bid request includes determining an estimated winning bid price based in part on a bid curve formed by an analysis if win rates of historical bid responses; and providing the estimated winning bid price as a parameter of the primary bid request.

Selecting the first bid response includes comparing the bid prices provided in the bid responses generated by the first set of decisioning computing subsystems with an estimated winning bid price; and setting a winning bid price based on results of the comparing. Setting a winning bid price based on results of the comparing includes one of the following: if the highest bid price and the second highest bid price provided in the bid responses are both higher than the estimated winning bid price, designating the bid response associated with the highest bid price as the selected bid response and setting the winning bid price to be a value that is based on the second highest bid price provided in the bid responses; if the highest bid price is higher than the estimated winning bid price and the second highest bid price is lower than the estimated winning price, designating the bid response associated with the highest bid price as the selected bid response and setting the winning bid price to be a value that is based on the estimated winning bid price; and if the highest bid price and the second highest bid price are both lower than the estimated winning bid price, designating the bid response associated with the highest bid price as the selected bid response and setting the winning bid price to be a value based on to the highest bid price.

The advertising call is received from an advertising server outside the advertising platform. The advertising call is received from a browser operable by the impression consumer. The advertising call is received through a canonical name redirect.

Taking an action on the first bid response includes generating an advertising call response that includes information sufficient to identify a creative associated with the first bid response; and providing the advertising call response to a source of the advertising call. The method further includes receiving from the source of the advertising call a notification that the creative associated with the first bid response was served to the impression consumer.

Taking an action on the first bid response includes generating a set of secondary bid requests each including information associated with the first bid response; and sending the set of secondary bid requests to a second set of decisioning computing subsystems of the advertising platform.

The method further includes selecting, using the transaction management computing subsystem, a second bid response from among the bid responses generated by the second set of decisioning computing subsystems; generating, using the transaction management computing subsystem, an advertising call response that includes information sufficient to identify a creative associated with the second bid response; and sending the generated advertising call response to the source of the advertising call.

The method further includes selecting, using the transaction management computing subsystem, a second bid response from among the bid responses generated by the second set of decisioning computing subsystems; generating, using the transaction management computing subsystem, an advertising call that includes information associated with the second bid response; and sending the generated advertising call to a decisioning component outside the advertising platform.

The generated advertising call satisfies advertising call formatting requirements associated with the decisioning computing component outside the advertising platform. The advertising call formatting requirements includes a specification of a bid price as a range of values. The advertising call formatting requirements includes a specification of a priority metric. Creative information associated with the first bid response is represented in the generated advertising call as a uniform resource locator, a javascript variable, or a cookie.

At least some of the primary bid requests include information selected according to predefined constraint criteria specified by an impression seller member with respect to each of the one or more advertisement spaces. At least some of the primary bid requests include information selected according to predefined constraint criteria specified by an impression buyer member.

The method further includes, for each transaction that occurs following the receipt of an advertising call by the transaction management computing subsystem, logging at least some of the following information: a transaction identifier, an impression consumer, the impression consumer's web browser, an ad tag, an impression, a creative selected to be served, the impression consumer's response to a creative that was served, a decisioning computing subsystem identifier, a bid response, a winning bid price, an estimated winning bid price, an identifier of a third party data provider that contributed data towards the generation of a bid response, a bid response time, and a no-bid response.

The method further includes taking at least one or the following actions with respect to the logged information: generating summarized information for the logged information at periodic intervals, and storing the summarized information for analysis; disseminating at least some of the collected information as market ticker data, report data, or both; disseminating an abstracted version of at least some of the collected information as market ticker data, report data, or both; and generating a debug log that is based on at least some of the collected information, and sending the debug log to an impression seller member.

The method further includes, for each transaction that occurs following the receipt of an advertising call by the transaction management computing subsystem, generating a notify request specific to each decisioning computing subsystem, wherein the notify request includes at least some of the following information: owner kept notification information, owner sold notification information, information about revenue or cost generated by the sale of an impression, non-owner win, lost, or pending win information, bid price information, winning bid price information, error notification information, impression information, and impression consumer information; and sending the notify requests to respective decisioning computing subsystems.

In a further general aspect, a system that provides an advertising platform includes decisioning computing subsystems each including a processor that is coupled to computer readable media having computer readable instructions recorded thereon for generating a bid response based on information included in a bid request; and a transaction management computing subsystem including a processor that is coupled to computer readable media having computer readable instructions recorded thereon. The processor is operable to execute the computer readable instructions to generate a set of primary bid requests responsive to receipt of an advertising call, each primary bid request including information sufficient to characterize an impression consumer and information sufficient to characterize each of one or more impressions identified in the advertising call; send the set of primary bid requests to a first set of the decisioning computing subsystems; select a first bid response from among the bid responses generated by the first set of the decisioning computing subsystems; and take an action on the first bid response.

Embodiments may include one or more of the following.

The computer readable instructions to take an action on the first bid response include instructions to generate an advertising call response that includes information sufficient to identify a creative associated with the first bid response; and provide the advertising call response to a source of the advertising call. The computer readable media further includes computer readable instructions to generate log data identifying the creative associated with the first bid response as having been served to the impression consumer based at least in part on a notification received from the source of the advertising call. The computer readable media further includes computer readable instructions to generate a set of secondary bid requests each including information associated with the first bid response; and send the set of secondary bid requests to a second set of decisioning computing subsystems in the advertising platform.

The computer readable media further includes computer readable instructions to select a second bid response from among the bid responses generated by the second set of decisioning computing subsystems; generate an advertising call response that includes information sufficient to identify a creative associated with the second bid response; and send the generated advertising call response to the source of the advertising call. The computer readable media further includes computer readable instructions to select a second bid response from among the bid responses generated by the second set of decisioning computing subsystems; generate an advertising call that includes information associated with the second bid response; and send the generated advertising call to a decisioning component of a system other than the system that provides the advertising platform.

At least one of the decisioning computing subsystems is operable to receive a bid guide that specifies an impression buyer member-specific set of decisioning rules. At least one decisioning computing subsystem is associated with a plurality of impression buyer members. At least some of the decisioning computing subsystems and the transaction management computing subsystem are physically co-located within a data center.

At least one decisioning computing subsystem is formed by a plurality of instances, each operable to generate bid responses on behalf of one or more impression buyer members. The computer readable instructions to send the set of primary bid requests to a first set of the decisioning computing subsystems include instructions to perform load balancing among the instances of a first decisioning computing subsystem.

The computer readable media further includes computer readable instructions to send a ready call to each of the decisioning computing subsystems; and send the set of primary bid requests to the first set of decisioning computing subsystems selected based at least in part on receipt of respective responses to the ready call. The computer readable media further includes computer readable instructions to send the set of primary bid requests to the first set of decisioning computing subsystems selected according to predefined constraint criteria specified by an impression buyer member, the impression seller member, or both.

Implementations of the invention may include one or more of the following advantages.

The speed of the computer system can be increased or, in other words the latency of the computer system can be reduced, by providing both one or more transaction management computing subsystems that generate bid requests and one or more decisioning subsystems that generate bid responses in response to the bid requests in one physical cloud infrastructure or by collocating the transaction management computing subsystems and decisioning subsystems. The increase in speed provided by this arrangement makes it technically feasible to include a plurality of decisioning subsystems for generating bid responses, which may each have their own algorithms or optimisation techniques, within the system within acceptable time scales.

Furthermore, the speed of the computer system can be increased or, in other words the latency of the computer system can be reduced, by enabling impression consumer data to be replicated across data center sites without having to send all of the impression consumer data to each data center following each impression trading opportunity. Rather, only the incremental updates of the impression consumer data are transmitted over the Internet for storage in user data stores that are local to respective data centers. Speed of operation is further increased if the incremental consumer data data that is generated and sent only includes data that the bidding computer subsystems are entitled to receive. Speed of operation is further increased by storing the impression consumer data client-side or, in other words, on the computer being used by the impression consumer. Yet further speed increases in generating a bid response result by storing the impression consumer data as an object and, in particular, a JavaScript Object Notation (JSON) object.

Bid requests in the computer system described herein include information sufficient to characterize each of a plurality of advertisement spaces identified in the advertising call, advantageously each advertisement space has a tag associated with it. Sending bid requests for multiple advertising spaces in the same request reduces speed of operation of the system improving the online experience of an impression consumer or person to whom online advertising is displayed as there is less delay while an advertisement is displayed.

The advertising platform or advertising cloud infrastructure or computer system enables any number of bidding providers to participate in transactions within the platform. Each bidding provider has a bidding engine that implements its own "secret sauce" optimization techniques to generate a bid response that quantifies in real-time the value of the impression consumer to the bidding provider's associated impression buyer members given information about the impression consumer (e.g., demographic, psychographic, and behavioral history) and the ad space. The optimization techniques may be tweaked and/or modified in real-time based on feedback received from the platform with respect to a most recent set of platform-based auctions regardless of whether the bidding provider itself was involved in those auctions, as well as proprietary data on impression consumers provided by the bidding provider itself. In so doing, each bidding provider is able to generate a competitive bid for each platform-based auction while maximizing the yield for its associated impression buyer member (e.g., by targeting certain creatives to highly desirable impression consumers).

The advertising platform enables each bidding provider to use its own information or information provided by any third-party data provider to determine the value of impression inventory. By removing any constraints on the number of third-party data providers that may provide such information and by enabling each bidding provider to identify and contract with any third-party data provider independently of the bidding provider's participation within the platform, there is no limit to the types of information that may be used by each bidding provider in determining the value of impression inventory. This flexibility further enables third-party data providers that provide information in many different sectors and industries to charge a premium rate for certain industries and sectors if there is a noticeable market demand for such data, and charge a regular rate for all other industries or sectors.

With some exceptions (e.g., the scenario in which a creative serving opportunity is part of a pre-existing media buy between an impression seller member and an impression buyer member), each and every bidding provider within the platform sees every creative serving opportunity in real-time and is afforded the opportunity to procure the impression inventory.

The advertising platform provides impression trading industry members with a low latency environment in which interactions may occur between members in real-time. Such interactions include, for instance, the multi-way exchange of data, the valuation of users and impressions, the comparison of creative standards, the evaluation of fraud, and the ability to contextualize, classify, and optimize the impression inventory being traded within the platform.

Co-locating infrastructure on one physical platform greatly reduces the number of network bottlenecks and potential problems that may be encountered on a per-auction basis. For example, rather than having to traverse multiple border routers, ISPs and load-balancers, a platform impression bus (also referred to in this description as an "Imp Bus") may request content directly from each individual bidding provider without having to worry whether there is a clear Internet path.

By co-locating the Imp Bus and the various bidding engines within a single data center (and possibly reproducing the Imp Bus and bidding engines and their relationships in multiple data centers for geographical efficiency), bid requests and bid responses may be sent and received within a very short period of time, generally measured in fractions of a single second (e.g., $\frac{1}{20}^{th}$ of a second). The ability to identify an ad creative to be served to an impression consumer rapidly results in a good user-experience and reduces (and ideally eliminates) the number of dropped impressions. By comparison, traditional redirecting techniques slow down the ad requests by bouncing the user, through a public network such as the Internet, between servers that may be physically located at disparate geographic locations. Each additional redirect (generally capped at a five redirects on a single ad call) results in about 3-5% of impressions lost.

Traditional redirecting techniques make the impression consumer's browser responsible for "integration." This means that any "integration" is entirely public, both to the end-user and any party that might be sniffing traffic in between. When a member is inserted into an ad call redirect stream, that member has full control over both the user's cookie and the ad request. Taking a contextual provider example, a contextual engine that is adding its data to the ad request has the ability to start building a behavioral profile of the user. The advertising platform enables various impression trading industry members to integrate and collaborate with each other and third-party data providers without any of the security risks and downsides resulting from traditional redirecting techniques.

The advertising platform enables impression industry trading members to fine tune future media buying by offering full transparency and analytics that may provide insight as to why an impression was won or lost and by how much, and which user segments are driving the member's return on investment measured, for example, per thousand impressions (CPMs).

The advertising platform provides an environment that benefits the impression industry trading members involved in impression trading within the platform, for example, by providing the members with an equal chance to buy and sell impression inventory via the Imp Bus and bidding providers, access more ad spaces and demand for ad spaces, and generally transact more efficiently from a business perspective and a technical perspective.

By making a set of APIs for the advertising platform widely available, any number of technology providers can create, market, and distribute (to the community of partners) technology solutions in the form of platform-compatible bidding engines and "secret sauce" optimization techniques. This has a "float to the top" effect in that those technology providers that are able to tweak their technology solutions to provide to their associated impression buyer members the "best bang for buck" will thrive in the marketplace while others quickly fall behind and are eventually eliminated. Further, this has the effect of encouraging new technology providers to innovate compatible technology solutions if a viable and profitable marketplace can be sustained.

By enabling a bidding provider to easily and quickly provision and deploy additional servers of the data center to implement its bidding engine, scalability may be achieved regardless of the number of impression buyer members a bidding partner is associated with and/or the volume of impressions the associated impression buyer members desire to acquire during a given time frame.

A requested page may have multiple ad spaces. The advertising platform may be implemented to enable an impression seller member's web server to make a call to the platform that invokes multiple ad tags (each ad tag being associated with a distinct ad space of the page) or a call to the platform that invokes a single page-level ad tag that includes multiple ad spaces. Some of the advantages of enabling these features are as follows: (1) one request to the platform reduces latency; (2) a single call that invokes multiple ad tags or a single page-level ad tag allows for the buying of 'packages' of ads. For example, an impression buyer member may indicate that it will take all three tags on a page for a $10 CPM. The Imp Bus may then compare the price of the "package" of ads to the highest individual bids; and (3) enables premium selling (road-blocks) and the ability to do competitive exclusions (e.g., do not show a Coca Cola® ad next to a Pepsi® ad).

The invention in its various aspects is defined in the independent claims below, to which reference should now be made. Advantageous features are set forth in the dependent claims.

One embodiment of the invention is described in more detail below and takes the form of a computer system for buying and selling online advertising, the computer system comprising one or more decisioning subsystems and a transaction management computing subsystem that are located in one physical cloud infrastructure and/or physically collocated.

The transaction management computing subsystem is configured to generate a bid request responsive to receipt of an advertising call. The bid request includes information sufficient to characterize an impression consumer and information sufficient to characterize each of one or more advertisement spaces identified in the advertising call. The transaction management computing subsystem is also configured to send the bid request to each of a selected one or more of the one or more decisioning subsystems; select one or more bid responses from amongst the bid responses returned by the selected one or more decisioning subsystems in response to the bid request; and generate an advertising call response based on the selected one or more bid responses.

Each decisioning subsystem is configured to generate at least one bid response based on information included in a bid request.

In general, in an aspect, a computer-readable media has computer-readable instructions recorded thereon for identifying one or more advertisement creatives to be served to an impression consumer. The instructions include instructions for generating a bid request in response to receipt of an advertising call, wherein the bid request includes information sufficient to characterize the impression consumer and information sufficient to characterize each of one or more advertisement spaces. The instructions include instructions for selecting one or more bidders within an advertising platform to receive the bid request, wherein each of the selected one or more bidders is operable to generate at least one bid response based on the information included in the bid request. The instructions include instructions for sending the bid request to each of the selected one or more bidders. The instructions include instructions for using predetermined bid selection criteria to select one or more bid responses from amongst the bid responses returned by the selected one or more bidders. The instructions include instructions for generating an advertising call response based on the selected one or more bid responses.

Implementations of the computer-readable media can include one or more of the following features. The computer-readable media includes instructions for generating a data retrieval request based on information included in the advertising call, wherein the data retrieval request includes information sufficient to uniquely identify user data store information associated with the impression consumer. The computer-readable media includes instructions for sending the data retrieval request to a data management component that organizes storage of user data store information within the advertising platform. The computer readable media includes instructions for generating the information sufficient to characterize the impression consumer based on information received from the data management component responsive to the data retrieval request.

The information sufficient to uniquely identify user data store information associated with the impression consumer and comprises an alphanumeric string of characters representative of an impression consumer identifier. The computer readable media includes instructions for generating a data retrieval request based on information included in the advertising call, wherein the data retrieval request includes information sufficient to uniquely identify data associated with each of the one or more advertisement spaces. The computer readable media includes instructions for sending the data retrieval request to a data management system component that organizes storage of advertisement space-related data within the advertising platform. The computer readable media includes instructions for generating the information sufficient to characterize each of the one or more advertisement spaces based on information received from the data management component responsive to the data retrieval request.

The information is sufficient to uniquely identify data associated with each of the one or more advertisement spaces comprises one or more alphanumeric strings of characters, each alphanumeric string being representative of an advertising tag.

The computer readable media includes instructions for selecting the one or more bidders to receive the bid request includes instructions for processing information included in the advertising call according to predefined constraint criteria specified by an impression seller member with respect to each of the one or more advertisement spaces. The computer readable media includes instructions for selecting the one or more bidders to receive the bid request from amongst a set of bidders within the advertising platform based on results of the processing.

The predefined constraint criteria comprises constraint criteria related to one or more of the following: price, geography, time of delivery, location of delivery, quantity, and language.

The instructions for selecting the one or more bidders to receive the bid request includes instructions for processing information included in the advertising call according to predefined class criteria specified by an impression seller member with respect to a class of advertisement spaces of which each of the one or more advertisement spaces is a member. The predefined class criteria comprises an exclusive advertisement space class, and wherein each of the one or more advertisement spaces that is a member of the exclusive advertisement space class is subject to a pre-existing media buy contractual agreement between the impression seller member and a respective impression buyer member.

The predetermined bid selection criteria comprises selection criteria related to one or more of the following metrics: a priority metric, a normalized price metric, an advertiser value metric, a percentage delivered metric, and an advertisement frequency metric.

The instructions for using the predetermined bid selection criteria to select one or more bid responses includes for each of the one or ore advertisement spaces, instructions for performing a first comparison of at least two bid amounts associated with bid responses associated with the respective advertisement space based on a normalized price metric; and if the first comparison yields a tie result, instructions for performing one or more additional comparisons of the at least two bid amounts based on one or more of the following metrics: a priority metric, an advertiser value metric, a percentage delivered metric, and an advertisement frequency metric.

The instructions for using the predetermined bid selection criteria to select one or more bid responses includes for each of the one or ore advertisement spaces, instructions for performing a first comparison of at least two bid amounts associated with bid responses associated with the respective advertisement space based on a normalized price metric; and if the first comparison yields a tie result, instructions for randomly selecting one of the bid responses.

The instructions for generating the advertising call response include instructions for generating an advertising call response that includes information sufficient to identify one or more advertisement creatives to be served to the impression consumer.

In general, in an aspect, a system provides an advertising platform, and the system includes one or more decisioning subsystems, each decisioning subsystem including a processor that is coupled to computer readable media having computer readable instructions recorded thereon for generating at least one bid response based on information included in a bid request. The system includes a transaction management computing subsystem including a processor that is coupled to computer readable media having computer readable instructions recorded thereon for identifying one or more advertisement creatives to be served to an impression consumer. The processor is operable to execute the computer readable instructions to: generate a bid request responsive to receipt of an advertising call, wherein the bid request includes information sufficient to characterize the impression consumer and information sufficient to characterize each of one or more advertisement spaces; select one or more decisioning subsystems within an advertising platform to receive the bid request; send the bid request to each of the selected one or more decisioning subsystems; use predetermined bid selection criteria to select one or more bid responses from amongst the bid responses returned by the selected one or more decisioning subsystems; and generate an advertising call response based on the selected one or more bid responses.

Implementations of the system can include one or more of the following features. One or more decisioning subsystems and the transaction management computing subsystem are physically colocated. At least one of the decisioning subsystems is operable to receive a bid guide that specifies a member-specific set of bidding rules. At least one of the decisioning subsystems comprises a hosted bidder operated by the advertising platform. The system includes a data store including information associated with a plurality of impression consumers. The system includes a first data management computing subsystem including a processor that is coupled to computer readable media having computer readable instructions recorded thereon for maintaining information stored in a user data store, wherein the processor is operable to execute the computer readable instructions to: receive from the transaction management computing subsystem a data retrieval request including information sufficient to uniquely identify user data store information associated with the impression consumer; and selectively update one or more components of the user data store information associated with the impression consumer.

The processor of the first data management subsystem is further operable to execute the computer readable instructions to generate a user data store update message that identifies the selectively updated one or more components of the user data store information associated with the impression consumer. The processor of the first data management subsystem is further operable to execute the computer readable instructions to send the user data store update message to one or more different data management subsystem.

The system includes a first data management subsystem hosted in a server in a first data center, the first data management subsystem and the transaction management system being co-located within the first data center; a second data management subsystem hosted in a server in a second data center, the first data center and the second data center being connected via a network; wherein the first data management subsystem includes a processor that is coupled to computer readable media having computer readable instructions recorded thereon for maintaining information stored in a user data store of the first data center, the processor being operable to execute the computer readable instructions to: receive from the transaction management computing subsystem a data retrieval request including information sufficient to uniquely identify information associated with the impression consumer that is stored within the user data store of the first data center; selectively update one or more components of the user data store of the first data center based in part on the data retrieval request; and generate a user data store update message that identifies the selectively updated one or more components of the user data store of the first data center; and wherein the second data management subsystem includes a processor that is coupled to computer readable media having computer readable instructions recorded thereon for maintaining information stored in a user data store of the second data center, the processor being operable to execute the computer readable instructions to: receive the user data store update message from the first data management subsystem; and selectively update one or more components of the user data store of the second data center based in part on the user data store update message.

The processor of the transaction management computing subsystem is further operable to execute the computer readable instructions to generate a bid request responsive to receipt of a server-side advertising call, a client-side advertising call, or some combination of both.

In general, in an aspect, a system provides an advertising platform, the system including a transaction management computing subsystem including a processor that is coupled to computer readable media having computer readable instructions recorded thereon for identifying one or more advertisement creatives to be served to an impression consumer; and a plurality of data management subsystems including a first data management subsystem hosted in a server in a first data center, the first data management subsystem and the transaction management system being co-located within the first data center, and a second data management subsystem hosted in a server in a second data center, the first data center and the second data center being connected via a network; wherein the first data management subsystem includes a processor that is coupled to computer readable media having computer readable instructions recorded thereon for maintaining information stored in a user data store of the first data center, the processor being operable to execute the computer readable instructions to: receive from the transaction management computing subsystem a data retrieval request including information sufficient to uniquely identify information associated with the impression consumer that is stored within the user data store of the first data center; selectively update one or more components of the user data store of the first data center based in part on the data retrieval request; and generate a user data store update message that identifies the selectively updated one or more components of the user data store of the first data center; and wherein the second data management subsystem includes a processor that is coupled to computer readable media having computer readable instructions recorded thereon for maintaining information stored in a user data store of the second data center, the processor being operable to execute the computer readable instructions to: receive the user data store update message from the first data management subsystem; and selectively update one or more components of the user data store of the second data center based in part on the user data store update message.

Implementations of the system can include one or more of the following features. The processor of the transaction management computing subsystem is further operable to execute the computer readable instructions to generate a bid request responsive to receipt of a server-side advertising call, a client-side advertising call, or some combination of both.

Other general aspects include other combinations of the aspects and features described above and other aspects and features expressed as methods, apparatus, systems, computer program products, and in other ways. It is clear that where the arrangement is described as a system or apparatus that it could equally be described as a method and vice versa.

An impression may be, for example, an advertising space, particularly one available on a website. The advertising space is typically a visual space, either for a still image or for moving images, but it could for example be for advertising presented as sound or a combination of visual features and sound features. An impression consumer is, for example, a person who looks at websites on which advertising is provided. He or she may be characterized by features such as age, income, and/or hobbies. A creative is, for example, the content for an advertising space or, in other words, the advertisement itself, whether provided visually and/or as sound.

Other features and advantages of the invention are apparent from the following description, and from the claims.

DETAILED DESCRIPTION

1 Computer System or Advertising Platform

Figure 1:
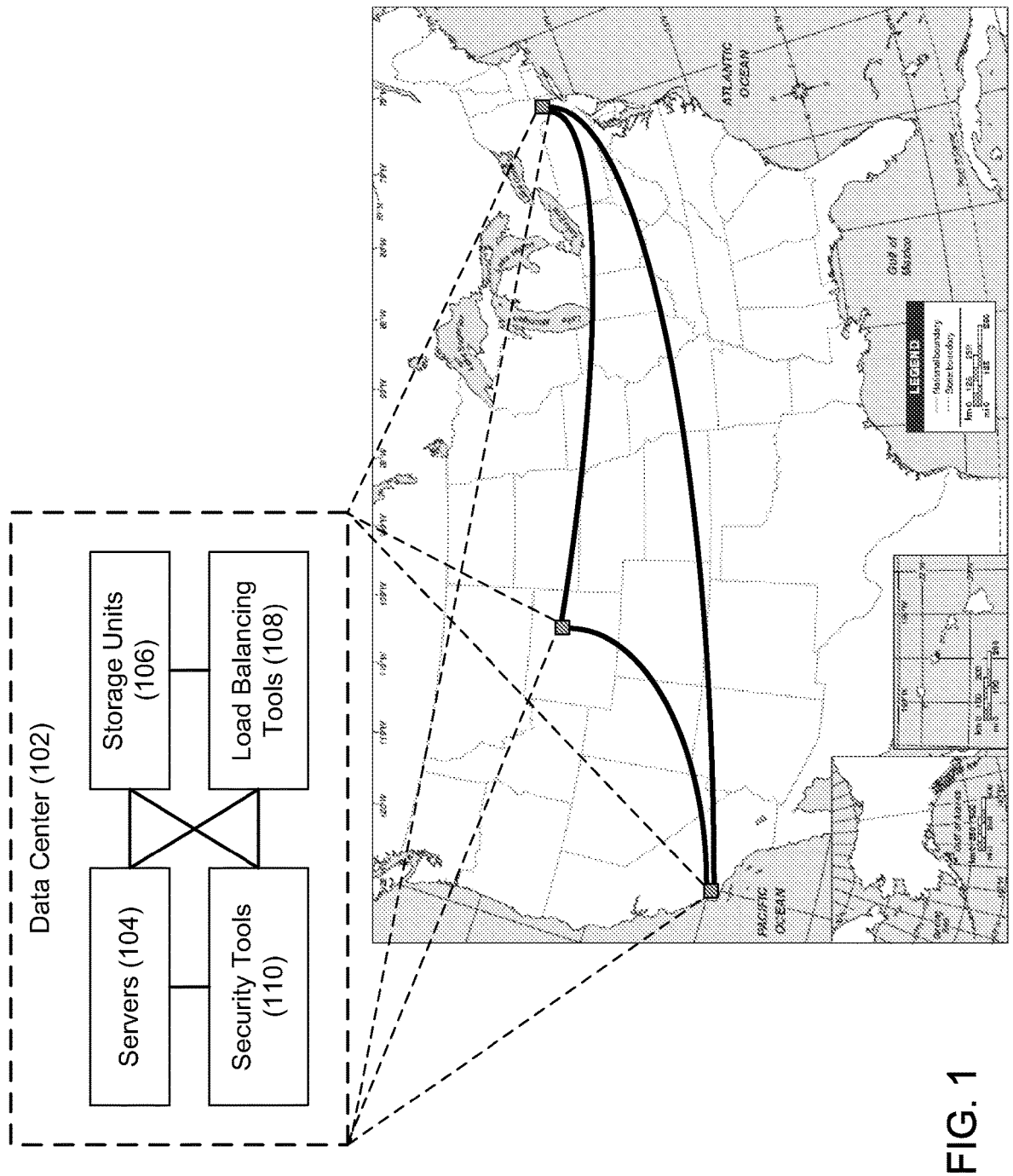
FIG. 1 shows an example of geographically dispersed multi-tenant enterprise data centers.
Figure 2:
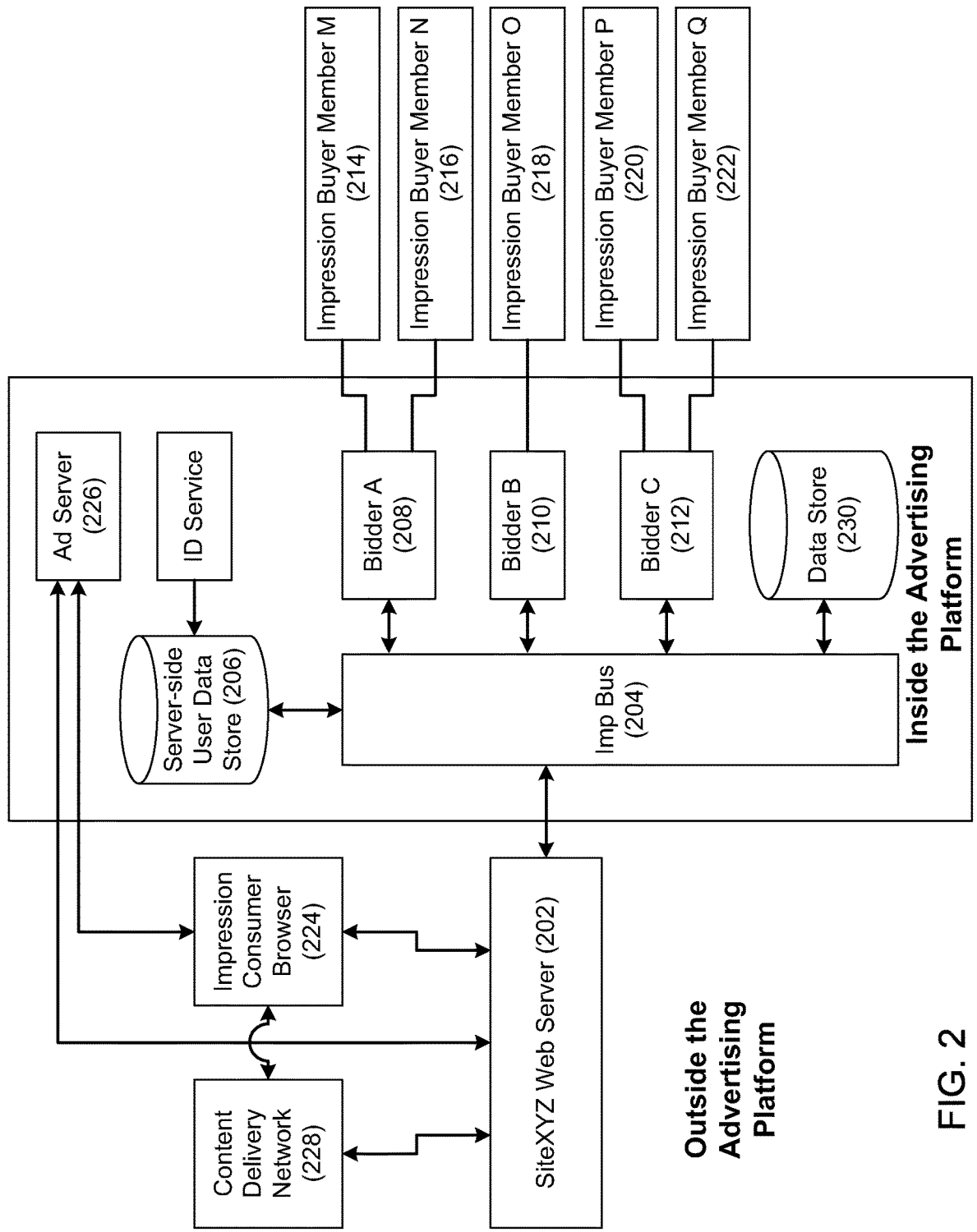
FIG. 2 shows a block diagram of an example advertising platform environment.
Figure 3A:
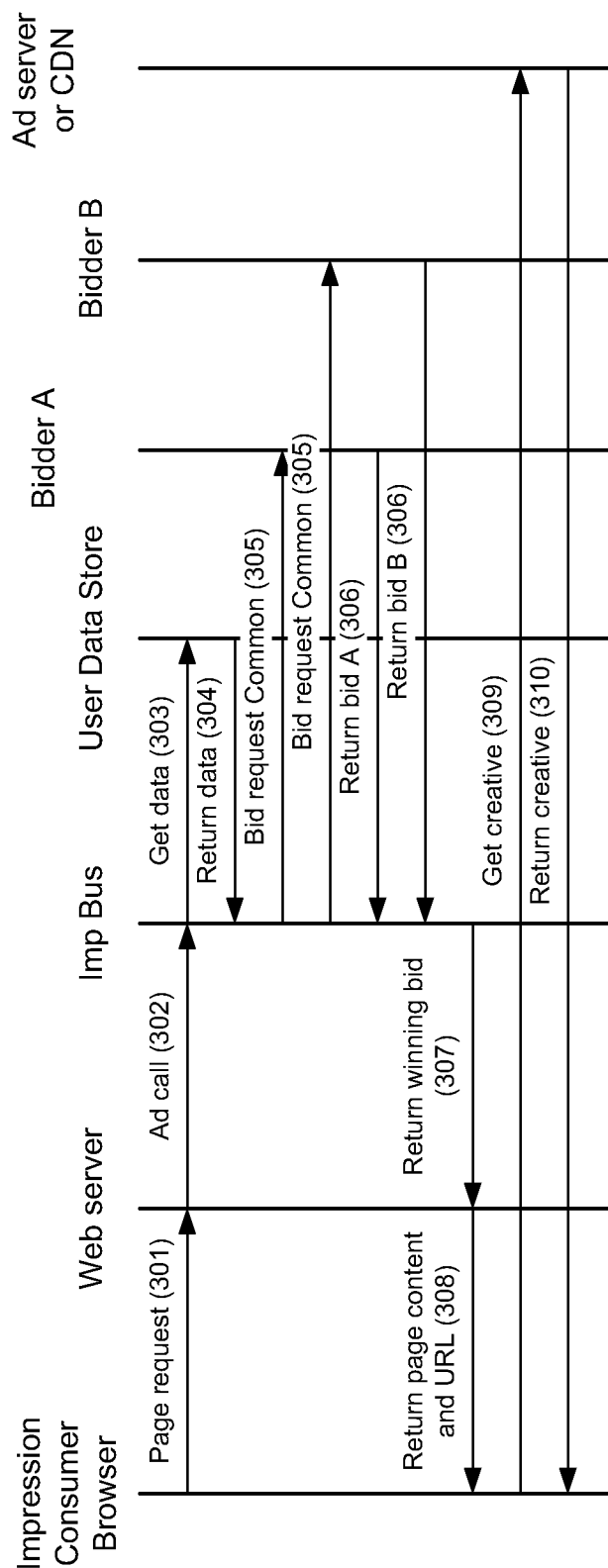
FIGS. 3A-3D each shows a ladder diagram of an exemplary use case.
Figure 3B:
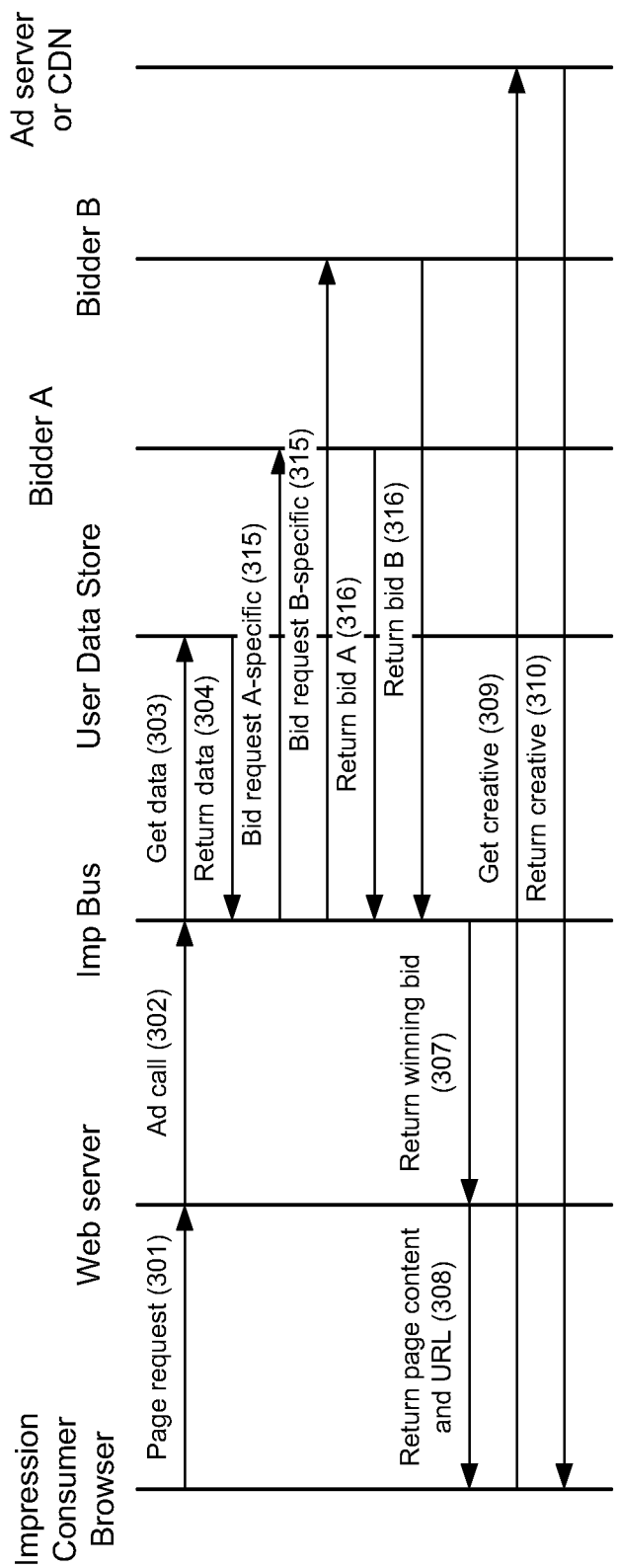
Figure 3C:
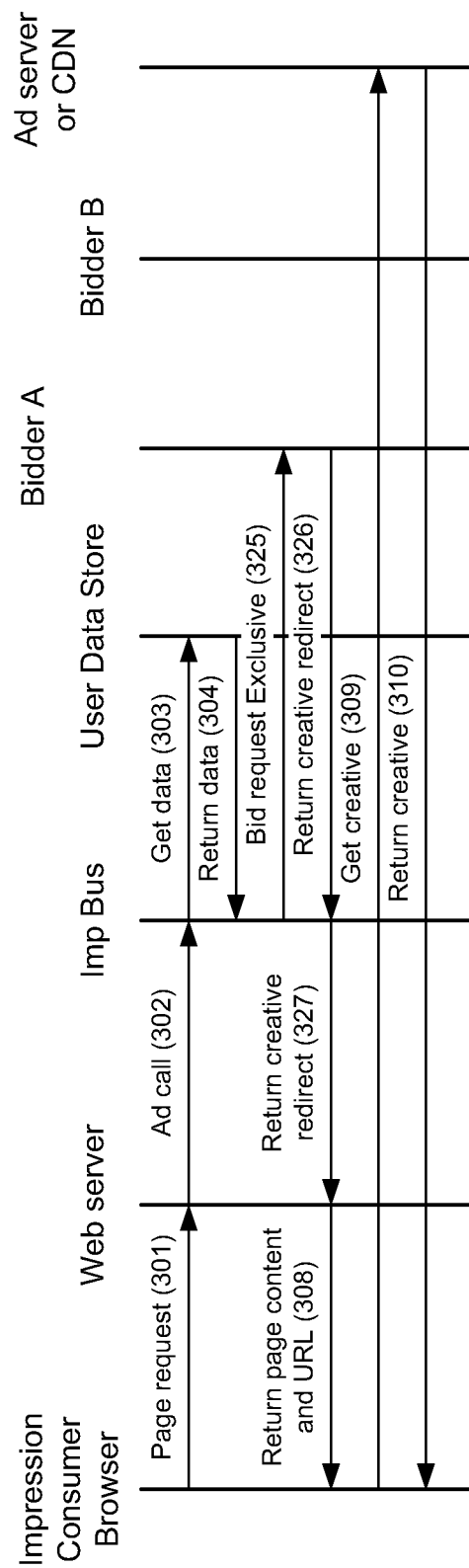
Figure 3D:
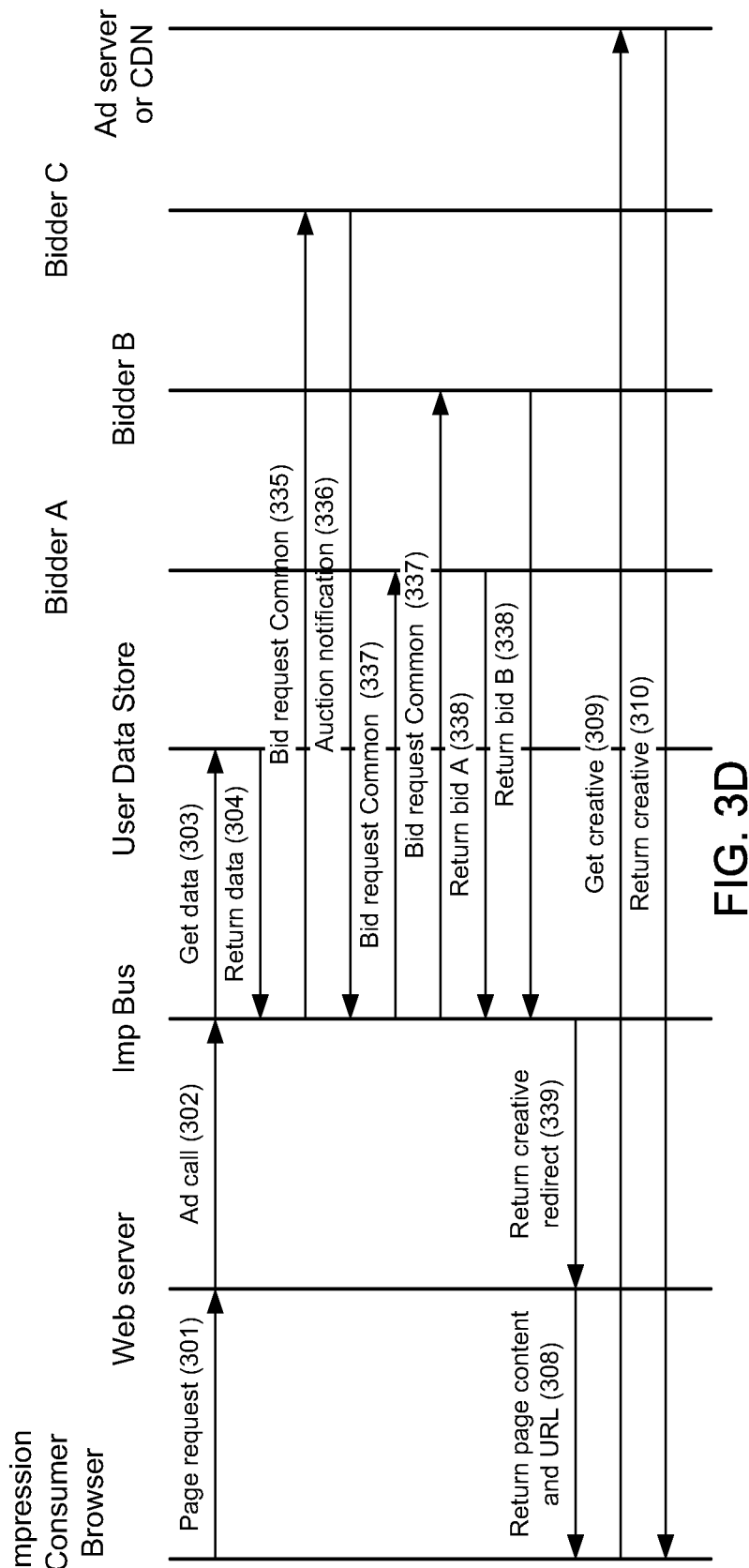

FIG. 1 shows geographically dispersed multi-tenant enterprise data centers 102 that are connected via one or more backbone providers (illustratively depicted by the heavy black lines). Each data center generally includes servers 104, load balancing tools 108 to manage traffic within a single data center and between multiple data centers, and for routing users to the fastest data center 102, storage units 106, and security tools 110 to protect each tenant's data and privacy. Other resources including power-, cooling- and telecommunication-related resources (not shown) are also included in each data center 102.

An infrastructure computer system for an advertising platform may be hosted on one or more of the data centers 102. This infrastructure ("advertising platform") provides an ecosystem ("cloud") in which entities associated with an impression trading industry may collaborate and share industry-specific information without the latency, bandwidth, and security issues typically associated with the public Internet. Such industry-specific information may include information associated with a user, a bidding provider, a member, a publisher page, a price, a creative, or some combination thereof.

The advertising platform includes servers 104 of the data center 102 that have been provisioned and deployed by data center tenants using application programming interface (APIs) specific to the advertising platform. In general, each server 104 that is provisioned and deployed by a tenant is reserved for the exclusive use of that tenant. Doing so provides some measure of predictability with respect to available resources, and provides an extra layer of security and privacy with respect to the tenant's data.

Various tenants of the data center 102 may assume different roles in the context of the impression trading industry. We describe each of these roles briefly as follows:

Advertising platform provider: An entity provisions and deploys a server 104 of the data center 102 to function as a transaction management computing subsystem (at times referred to in this description as a "platform impression bus" or simply "Imp Bus") that facilitates the transaction aspects of impression inventory trading. In general, the Imp Bus processes ad requests, feeds data to members, conducts auctions, returns ads to the publishers, keeps track of billing and usage, returns auction-result data, and enforces quality standards.

Impression seller member: An entity that sells impression inventory may provision and deploy a server 104 of the data center 102 to function as a web delivery engine that accepts HTTP(s) requests from web browsers operable by impression consumers. Such a web delivery engine may implement the following features: authentication and authorization request (e.g., request of username and password), handling of static and dynamic content, content compression support, virtual hosting, large file support, and bandwidth throttling, to name a few.

Impression buyer member: An entity that buys impression inventory may provision and deploy a server 104 of the data center 102 to serve creatives (e.g., in those instances in which creatives are stored on a storage unit 106 within the data center 102) or facilitate the serving of creatives (e.g., in those instances in which creatives are stored on an ad server or a content delivery network located on server outside of the data center 102). The entity may be an advertiser (e.g., Visa Inc.), an advertising network, an advertising agency (e.g., OMG National), an advertising exchange (e.g., Right Media Exchange by Yahoo! Inc.), or a publisher (e.g., MySpace).

Bidder: To buy impression inventory, each impression buyer member engages a decisioning computing subsystem (e.g., a bidder) to operate on its behalf. The term "bidder" generally refers to a piece of technology rather than an entity that operates it, and includes a bidding engine that takes various pieces of bid-specific information as input and generates a bid for a particular item of impression inventory on behalf of an impression buyer member. The advertising platform provides impression buyer members with a number of different bidder options, including:

a. Use a member-specific bidder: The advertising platform provider provides a source code skeleton and allows the impression buyer partner to apply its own secret optimization sauce to fill it in. In this case, the entity that buys impression inventory will further deploy a server 104 of the data center 102 to host a member-specific bidder for its exclusive use.

b. Use the hosted bidder: This bidder is designed, built, hosted, and maintained by the advertising platform provider and allows each impression buyer member to simply upload bid guides or modify basic parameters, such as user data, recency, location, etc. In some instances, multiple impression buyer members use the hosted bidder.

c. Use a Bidding Provider: A bidding provider is an entity that provisions and deploys a server 104 of the data center 102 to operate a bidder on behalf of one or more impression buyer members with which it is contractually engaged. The bidder operable by the Bidding Provider generally includes a proprietary optimization bidding engine.

Each tenant of the data center 102 may further assume additional or different roles than that described above.

The advertising platform also includes a cluster of high-performance storage units 106 of the data center 102. Data stored by a tenant on a storage unit 106 of the data center 102 may be accessed exclusively by that tenant, or shared with other tenants within the data center if so configured. The types of data that may be stored include advertising tags ("ad tags"), reserve price information, creatives, reserve creative information, cookie information, and market analysis information. Other information that may facilitate the trading of impression inventory within the platform may also be stored on storage units of the data center.

1.1 Impression Inventory and Ad Tags

The interactive nature of the Internet provides a number of advertising solutions that take advantage of the two-way communication and direct connections established between browser and content server for every user. Web pages, web-enabled video games, web-based broadcasts of multimedia programming, and web-enabled photo frames are just a few examples of the types of multimedia streams in which electronic advertisements may be injected. Traditionally, creatives (including still images and video advertisements) appear in ad spaces that are located within a web page. More recently, web-enabled video games have been coded to enable a creative to be dynamically loaded within an ad space of a game frame (e.g., in a billboard on the side of a highway of a car racing game, and in signage affixed to a roof of a taxi cab in a character role playing game). Similarly, web-based broadcasts of multimedia programming (e.g., a live broadcast or on-demand replay of a sporting event) may be coded to enable a creative to be dynamically loaded within an ad space of a broadcast frame (e.g., an ad space behind home plate during the broadcast of the sporting event) or within an ad space between broadcast frames (e.g., an ad space that coincides with a live commercial break). Web-enabled photo frames are generally configured to receive digital photos from photosharing sites, RSS feeds, and social networking sites through wired or wireless communication links. Other electronic content, such as news, weather, sports, and financial data may also be displayed on the web-enabled photo frame.

Each of the multimedia stream types described above provides a host of creative serving opportunities. To facilitate the transaction of impression inventory on the platform, an impression seller member (e.g., a publisher of a web site or a video game) may associate each creative serving opportunity with an ad tag. In general, an ad tag specifies information indicative of attributes of an ad space with which the ad tag is associated. In the case of an ad space within a web page, the ad tag may specify the language of the text displayed on the page, the nature (e.g., business, politics, entertainment, sports, and technology) of the content being displayed on the page, the geographical focus (e.g., international, national, and local) of the web page content, the physical dimensions of the ad space, and the region of the page the ad space is located. In the case of an ad space within a web-enabled video game, the ad tag may specify the video game category (e.g., role playing, racing, sports, puzzle, and fighting), the age appropriateness of the video game (e.g., via an Entertainment Software Rating Board (ESRB) rating symbol: early childhood, everyone, everyone 10+, mature, teen, and adults only), and the nature of the content being displayed within the game frame (e.g., via an Entertainment Software Rating Board (ESRB) content descriptor: alcohol reference, animated blood, crude humor, intense violence, language, mature humor, nudity, tobacco reference, and drug reference). In the case of an ad space within a web-based broadcast of multimedia programming, the ad tag may specify the language of the audio associated with the programming, the nature (e.g., business, politics, entertainment, sports, and technology) of the content associated with the programming, the geographical focus of the programming, and the time of day the programming is being broadcast live or the time period in which the programming is available on demand.

In some implementations of the advertising platform, a platform-specific ad tag may be generated and associated with ad space(s). In addition to the types of information described above, other types of information, such as a universal inventory identifier, a reserve price, and a list of approved universal advertiser identifiers, may also be associated with a platform-specific ad tag. The information associated with any given platform-specific ad tag may be specified server-side (e.g., tag_id=123&ad_profile_id=456) or maintained within the platform by a server-side mapping (e.g., Imp Bus maintains a server-side mapping of tag_id=123 to ad_profile_id=456). In the latter case, once an ad space has been tagged, information associated with the platform-specific ad tag may be easily modified by adding or otherwise changing the information within the platform without having to re-tag the ad space.

Each universal inventory identifier uniquely identifies a multimedia stream within the platform. As an example, a "large" multimedia stream (e.g., the news website CNN.com) may be divided into multiple multimedia streamlets (e.g., CNN.com/entertainment, CNN.com/health, CNN.com/technology, and CNN.com/travel), where each multimedia streamlet is assigned a universal inventory identifier within the platform. By contrast, a "small" multimedia stream (e.g., the news website BostonHerald.com) may be assigned only one universal inventory identifier. The inclusion of a universal inventory identifier within a platform-specific ad tag enables bidders to refer to impression inventory associated with a particular multimedia stream in a common way. The size of the impression inventory associated with a multimedia stream is not the only factor in determining whether a multimedia stream is assigned one universal inventory identifier or multiple universal inventory identifiers. Other factors, such as the multimedia stream brand, may also be in play. For example, a single universal inventory identifier may be assigned to a "large" multimedia stream (e.g., web pages with a myspace.com domain name) based on its brand identity.

In some cases, a multimedia stream or some aspect of it includes impression inventory that is designated within the platform as "direct" inventory. In general, direct inventory refers to impression inventory that is part of a pre-existing media buy. Such a media buy is typically established by way of a contractual agreement between an impression seller member and an impression buyer member. The contractual agreement specifies the specific impression inventory that is subject to an exclusive first right of refusal on the part of the impression buyer member, and the reserve price that bidders other than the bidder operating on behalf of the impression buyer member must meet in order to take the impression inventory away. This process will be described in more detail below with respect to the exemplary use cases in the following section.

In some cases, a multimedia stream or some aspect of it includes impression inventory that may only be acquired by certain impression buyer members, or more specifically, impression buyer members that serve a specific brand of ad creatives. In such cases, a bidder performs an offline process that synchronizes creatives and/or brands that are approved or banned to run on the impression inventory with a specific ad profile ID that is subsequently passed along on the bid request.

1.2 Ad Creatives

Ad creatives for various campaigns may be stored in storage units of the data center that function as an ad server for an impression buyer partner or hosted on ad servers and content delivery networks outside of the platform.

In some implementations of the advertising platform, an impression buyer partner is required to provide information that characterizes each ad creative that may be served responsive to ad calls from the platform, and store such information within the platform. Such information may include attribute information that characterizes the type, dimensions, and content of the ad creative, and information (e.g., a redirect to a content delivery network) that identifies where the ad creative can be retrieved from. In other implementations of the advertising platform, it is merely recommended that such information be stored within the platform and therefore accessible by the bidder acting on behalf of the impression buyer partner with minimal latency during the real-time bidding process (described in more detail below). In still other implementations of the advertising platform, the advertising platform provider itself looks at the creatives and supplies any of these attributes.

1.3 Creative Approval

In some embodiments, the creatives that are served in response to ad calls from the advertising platform conform to requirements, such as legality, decency, and common sense. For instance, creatives that promote gambling; depict libelous, violent, tasteless, hate, defamatory, or illegal content; portray partial or complete nudity, pornography, and/or adult themes or obscene content; are deceptive or purposely mislabeled; or spawn pops, simulate clicks, or contain malicious code, viruses, or executable files are generally not permitted.

Some publishers may prefer the creatives that are served to their inventory to comply to even more restrictive standards, for instance in order to maintain the reputation of the publisher's brand or to avoid promoting a rival. To simplify and speed the creative approval process for publishers, a list of preapproved creatives may be generated and maintained by a creative auditing computing subsystem on the advertising platform. When creating ad profiles, impression seller members can search for and/or elect to automatically approve creatives on this list, thus effectively outsourcing initial creative approval to a platform-based audit. For instance, the platform-based audit may review creatives for features such as having a meaningful and easily discernable brand or product offering; rotating images but not rotating brands or products; and having a brand on a platform-based list of approved brands. Additionally, the platform-based audit may prohibit creatives offering sweepstakes, giveaways, quizzes, surveys, or other brand-less games. If a brand is not discernable in a creative, it will not be approved and will run only on a member's exclusive inventory. Creatives that are modified after they have been audited will return to a 'pending' status until they can be audited again. In some instances, advertisers may be charged a nominal fee in order to have their creatives audited.

Impression seller members (e.g., publishers) may also review and approve creatives on a case-by-case basis by creating an ad profile. If no default ad profile is created for a publisher, all creatives will be allowed to run on the publisher's domain. An ad profile includes three elements: members, brands, and creatives. Member- and brand-level approval standards can be used to reduce the number of creatives that need to be explicitly approved. For instance, when setting up the ad profile, a publisher may choose "trusted" for members and brands that the publisher believes will always present acceptable ads. If a member or brand is marked as "trusted," all creatives of that member or brand will run by default, mitigating the need to audit each of that member's/brand's creatives. However, the publisher can override this default by reviewing the creatives and banning individually any creatives of the trusted brand. The publisher may mark other members or brands as "case-by-case," meaning that none of the creatives of that member or brand will run until explicitly approved by the publisher. The publisher may also mark members or brands as "banned," in which case none of the creatives of the banned member or brand will be shown. If a member or brand is banned, there is no ability to override the ban and approve a specific creative without knowing and searching for an individual creative ID. In some instances, a separate ad profile is created for each advertising campaign. The ad profiles are stored by the transaction management computing subsystem in an impression seller data store associated with the corresponding impression seller member and updated upon receipt of a new or updated profile. For more granular control over quality standards, the publisher may also approve and ban at the level of individual creatives. To review specific creatives, the publisher can search for creatives using specific criteria. A preview of the creative will appear and the publisher selects whether to approve or ban the creative.

1.4 Inventory Approval

Similarly, in some embodiments, publishers are required to conform to certain standards of legality, decency, and common sense. For instance, publishers that embody any of the following characteristics are generally not permitted to participate in the advertising platform: desktop applications, download accelerators, non-website based widgets and/or toolbars; gambling (free, paid, or gateway to paid gambling); libelous, violent, tasteless, hate, defamatory, or illegal content; or nudity, pornography, and/or adult themes or obscene content; peer to peer, bit torrent, or other websites facilitating illegal file sharing; proxy sites facilitating anonymous web browsing; sites enabling or permitting illegal activities and/or copyright infringement; or Warez or mp3 downloads.

Inventory may be grouped into predefined lists such that bidder clients can make decisions about a large amount of inventory simply by knowing the group to which the inventory belongs. The site that each impression that passes through the Imp Bus belongs to is on a single class list. The list to which a particular site and its corresponding impression belongs is communicated along with the ad call to each bidder participating in an auction. Individual bidders are then free to make their own decisions about whether to bid on that impression.

For instance, inventory may be categorized as Class 1, Class 2, unaudited or Black List. Class 1 inventory has been audited by a platform-based auditor and represents many of the most popular publisher brands on the Internet. Each of the URLs on the Class 1 list has a minimum monthly volume, e.g., 100,000 impressions per month, and is certified to pass global inventory content standards. The Class 1 list is intended to be completely safe for any brand advertiser to purchase. Class 1 inventory does not contain sites that feature user-generated content or social media. Bidders accept Class 1 inventory by default.

Class 2 inventory includes inventory that has been audited but does not meet the Class 1 volume or content criteria, but does meet the global inventory content standards. Social networking content is included in Class 2 inventory. For instance, myspace.com, although a top publisher that by volume satisfies the Class 1 criteria, is placed on the Class 2 list because it is social media. Bidders accept Class 2 inventory by default. If a bidder has chosen not to accept Class 2 inventory but also owns a Class 2 publisher, the bidder will receive its own Class 2 traffic.

All other inventory that passes through the Imp Bus is assigned the unaudited inventory label. Sites remain categorized as unaudited until audited and assigned to another categorization. To ensure maximum advertiser brand protection, bidders by default do not accept unaudited inventory; however, a flag can be set to enable unaudited inventory if desired. If a bidder does not accept unaudited inventory but owns an unaudited publisher, the bidder will receive its own unaudited traffic.

Inventory contained in the Black List violates inventory content standards and has been prohibited (i.e., it will never reach the auction marketplace). If the inventory originates from a Price Check tag (discussed in greater detail below), the inventory will be redirected to be handled by other demand sources. If the impression originates from a TinyTag (discussed in greater detail below), the ad server will return no content to the browser, essentially blanking the ad space.

1.5 Multi-Tenant Server-Side User Data Store

In some implementations of the advertising platform, a multi-tenant user data store (also referred to in this description as a "server-side user data store") is provisioned within the platform by a first user data store management component to enable members of the impression trading industry to synchronize their user data information with a common set of platform-specific user IDs.

Each platform-specific user ID of the server-side user data store is stored in association with data, some of which may be specific to a particular impression consumer (e.g., data characterizing the impression consumer). In general, data that is stored in association with a platform-specific user ID is supplemented and appended to over the course of time as the impression consumer interacts with web delivery engines within the platform.

In some implementations, all data stored in association with a platform-specific user ID may be shared between all tenants of the data center(s). In other implementations, mechanisms may be put in place to limit access to the data stored in association with a platform-specific user ID based on certain criteria. For example, certain impression trading industry members may have contractual agreements that specify exclusive sharing of data stored in association with a particular set (or sets) of platform-specific user IDs regardless of which web delivery engine a content request is directed to. In another example, an impression trading industry member may specify that all data stored in association with a particular set (or sets) of platform-specific user-ids may be shared with respect to a particular set of web delivery engines, some of which may be associated with other impression trading industry members.

In one specific implementation, user data information stored in association with a platform-specific user ID is formed by multiple segments of key-value pairs, where one or more key-value pairs may define each segment. Access permissions may be associated with one, some, or all of the segments to control which member(s) access (e.g., read and/or write) the user data information of respective segments.

One issue that may arise following the serving of ads to a single impression consumer by impression seller partners located in geographically dispersed data centers is "synching collision." Synching collision occurs when multiple impression seller members attempt to simultaneously sync their user data information with a particular segment of key-value pairs that defines the user data information stored in association with a particular impression consumer's platform-specific user-id. This is best described with an example.

A user 12345 has two browser windows open, one pointing to a landing page of www.SiteAAA.com, which is hosted on a web server ("SiteAAA web server") located in New York City, N.Y., and the other pointing to a landing page of www.SiteBBB.com, which is hosted on a web server ("SiteBBB web server") located in San Jose, Calif. Each web server makes an ad call to the platform when the user 12345 navigates to respective pages of www.SiteAAA.com and www.SiteBBB.com, each of which includes at least one creative serving opportunity. This has the effect of causing the advertising platform to receive two impression requests for user 12345, one from the SiteAAA web server, which gets routed to the platform's New York City data center, and the other from the SiteBBB web server, which gets routed to the platform's Los Angeles, Calif. data center. Each of the platform's data centers includes a server-side user data store that has in it a variable global-frequency associated with user-id=12345.

Suppose, at time t=0, the global-frequency key-value pair of a user's impression frequency counter for user-id=12345 is "25". Traditionally with cookies, the global-frequency is set to a fixed value. Synching collision occurs when two impression requests are received nearly simultaneously and a "set global-frequency to 26" notification is sent responsive to both impression requests. In other words, only one of the impression requests is logged in the user data store even though two are received. To avoid this situation, the advertising platform is implemented to send an "increment global frequency by 1" notification responsive each of the impression requests. Returning to the example above, the New York City data center will increment the global-frequency key-value pair for user-id=12345 to "26" to account for the ad call received from www.SiteAAA.com and transmit a message to the Los Angeles data center to apply the same logic; the Los Angeles data center will increment the global-frequency key-value pair for user-id=12345 to "27" to account for the ad call received from www.SiteBBB.com and transmit a message to the New York City data center to apply the same logic. In this manner, even though the messages are processed in different order on each site the final result is the same. That is, the global-frequency key-value pair for user-id=12345 goes from "25" to "27". User data store information is replicated consistently across multiple data centers.

1.6 Multi-Tenant Client-Side User Data Store

Each bidder is assigned a section of cookie space, known as a client-side user data store, in each user's browser. A bidder may freely push and pull data into or out of its own client-side user data store on each impression or pixel call. The data pushed into a particular bidder's client-side user data store is passed into requests for that bidder only, unless data contracts exist to allow the sharing of data with other bidders. However, when data is stored client-side by an advertiser outside of the user data store associated with the advertising platform provider, that data is inaccessible during an ad call, because the advertising platform domain, rather than the advertiser domain is accessing the cookie. For this reason, data stored by the bidder is preferably stored synchronously in the client-side user data store by piggy-backing a pixel call from the advertising platform.

In some implementations, user data is passed to the client-side user data store using a JavaScript Object Notation (JSON) mechanism. The advertising platform provider will execute a JavaScript function stored in each bidder's server-side context store and store the results in that bidder's section of the user's client-side user data store. Strings, integers, vectors, hash tables, and combinations of these may be stored and manipulated server side using a fully featured programming language such as JavaScript 1.8.1.

More particularly, a bidder's user data is stored in the user's cookie as a JSON object. During a bid request, the JSON object is forwarded to the bidder. If no JSON object exists, an empty object "{ }" may be returned. The JSON object is parsed for reading using libraries provided by the advertising platform provider. Instead of creating a new JSON object to send back to the client-side user data store, a bidder includes in the bid response a call to a predefined JavaScript function stored in association with that bidder. The JavaScript function, which operates on a global variable containing the user data, is executed by the Imp Bus, and the results are stored in the client-side user data store. In some embodiments, the advertising platform provider may provide functions for use or customization.

For instance, a bidder may wish to track the number of times a creative has been shown to a particular user or the most recent time an ad was shown to that user. In response to receipt of a notification that a creative has been served, a predefined function provided by the advertising platform provider may enable frequency and recency variables associated with that user to be incremented.

In some embodiments, each data provider or bidder has its own scheme for internally identifying users. In order to enable integration between the bidder and the Imp Bus, the bidder-specific user ID for each user is mapped to the platform-specific user ID for the same user.

In general, the platform-specific user ID is stored in a client-side user data store, such as in a client-side browser cookie. The mapping between bidder user ID and platform-specific user ID may exist in the bidder's data store, the server-side cookie store of the advertising platform, or both. In some instances, the bidder's user IDs are stored within the bidder's reserved section of the client-side user data store. In this case, the bidder's user ID is included in each request the bidder receives from the Imp Bus, such as bid requests and pixel requests. In other instances, the mapping information is stored within the bidder's data store. In this case, when impression or pixel requests are received by the bidder related to a platform-specific user-id, the bidder looks up the mapping information in its own data stores.

2 In Operation

Referring also to FIGS. 2 and 3A-3E, in some examples, an impression seller member hosts a web site (e.g., "SiteXYZ.com") on a web server ("SiteXYZ web server" 202). The web site provides a number of creative serving opportunities, each of which is associated with a platform-specific ad tag.

A request for a page of SiteXYZ.com that is generated by an impression consumer's web browser is received (301) by the SiteXYZ web server 202. If the requested page includes one or more creative serving opportunities, the web server 202 makes an ad call (302) to the platform by redirecting the page request to the Imp Bus 204. The Imp Bus 204 examines a browser header of the page request to determine if a platform-specific user ID is included therein.

In the following sections, we describe a number of exemplary use cases following an ad call to the platform. Actions taken by various actors within the platform are tagged with respective reference numerals. To minimize the repetition of textual description, we may at times in the following sections cite a reference numeral as shorthand for an action that may be taken by an actor within or outside the platform.

2.1 Use Case #1 (FIG. 3A): Known Impression Consumer, No Restrictions on Data Sharing, Open Platform-Based Auction If a platform-specific user ID (e.g., User ID 1234) is found within the browser header, the Imp Bus 204 deems the page request as originating from a "known" impression consumer, and retrieves (303, 304) from a server-side cookie store 206 within the platform, data that has been stored in association with the platform-specific user-id.

Let us assume for this use case that none of the creative serving opportunities on the requested page is restricted (e.g., the platform-specific ad tag does not specify a list of approved universal advertiser identifiers) with respect to impression buyer members that may win an open platform-based auction to serve a creative. Let us further assume that data retrieved from the server-side cookie store may be shared between impression trading industry members without constraints.

The Imp Bus 204 or transaction management computing subsystem generates a bid request that provides a multi-faceted characterization of each creative-serving opportunity of the requested page. In some implementations, there is a one-to-one correspondence between creative-serving opportunities and bid requests, i.e., a bid request is generated for each ad tag associated with the requested page. In some implementations, the multiple ad tags associated with the requested page are handled in a single bid request.

In general, the bid request includes information that characterizes the impression consumer (e.g., based on data retrieved from the server-side cookie store), the ad space (e.g., based on information associated with the platform-specific ad tag itself, such as data uniquely identifying the impression seller member, an impression inventory identifier, an impression inventory categorization identifier, or a universal impression inventory identifier; or data characterizing the impression, the impression seller member, the impression inventory source, or an impression inventory category), and an auction identifier. Because there are no constraints placed on the sharing of data between impression trading industry members, one bid request (e.g., Bid request Common 305) may be generated and sent to all bidders 208, 210, 212.

The Imp Bus 204 sends (305) the bid request to each bidder 208, 210, 212 within the platform. The information included in the bid request is used (at least in part) by a bidding engine of each bidder 208, 210, 212 or a decisioning processor of a decisioning subsystem to generate a real-time bid response on behalf of an impression buyer member 214, 216, 218, 220, 222 with which the bidder 208, 210, 212 is associated, and return (306) the bid response to the Imp Bus 204. At a minimum, the bid response identifies a bid price, determined, for instance, using optimization techniques; and a creative that is to be served should the bid be identified as the winning bid of a platform-based auction. Recall that a bidder (e.g., Bidder A 208) may be associated with multiple impression buyer members (e.g., Impression Buyer Member M 214 and Impression Buyer Member N 216). In such instances, the bidding engine may be operable to conduct an internal auction to identify a winning bid from amongst the eligible campaigns of its associated impression buyer members, and to generate a bid response for the platform-based auction based on the result of the internal auction.

The Imp Bus 204 or transaction management computing subsystem identifies a winning bid from amongst the bid responses returned by the bidders 208, 210, 212 or decisioning subsystems within a predetermined response time period (e.g., measured in milliseconds). Although in most instances, the "winning bid" is the bid associated with the highest dollar value, and the "best price" for a creative serving opportunity is the price that yields the highest revenue for the impression seller member, there are instances in which the "winning bid" and the "best price" are based on other metrics, such as ad frequency. If the winning bid response is associated with a creative that has not been approved by the impression seller member, the second-ranked bid response is selected. The Imp Bus 204 returns (307) a URL that identifies a location of a creative of the winning bid to the SiteXYZ web server 202. In the depicted example, the SiteXYZ web server 202 returns (308) to the impression consumer's web browser 224 the requested page, which is embedded with an impression tracking mechanism that causes the impression consumer's web browser 224 to first point to the Imp Bus (for use by the Imp Bus in counting the impression as served) and subsequently cause the impression consumer's web browser 224 to retrieve (309, 310) the ad creative to be served from an ad server 226 within the platform or a server of a content delivery network 228. In another example, the SiteXYZ web server 202 returns to the impression consumer's web browser the requested page, a first URL that points to the ad creative to be served, and a second URL that points to the Imp Bus (for use by the Imp Bus in counting the impression as served).

2.2 Use Case #2 (FIG. 3B): Known Impression Consumer, Some Restrictions on Data Sharing, Open Platform-Based Auction The Imp Bus performs actions (303, 304) as described above.

Let us assume for this use case that restrictions have been placed on the sharing of data retrieved from the server-side cookie store 206 between some of the impression trading industry members. For each impression trading member, the Imp Bus 204 examines the restrictions to identify the subset of data retrieved from the server-side cookie store that may be shared with that impression trading member. For each creative serving opportunity of the requested page, the Imp Bus 204 generates an impression trading member-specific bid request (e.g., Bid request A-specific and Bid request B-specific) that provides a multi-faceted characterization of that creative serving opportunity. In general, the bid request includes information that characterizes the impression consumer (e.g., based on the subset of data retrieved from the server-side cookie store that may be shared with that impression trading member), the ad space (e.g., based on information associated with the platform-specific ad tag itself), and an auction identifier.

The Imp Bus 204 sends (315) the appropriate bid request to each bidder 208, 210, 212 within the platform, which acts on the bid requests in a manner similar to that described above and returns (316) bid responses to the Imp Bus 204. The Imp Bus 204 identifies a winning bid from amongst the bid responses returned by the bidders 208, 210, 212, and returns (307) a URL that identifies a location of a creative of the winning bid to the SiteXYZ web server 202. Actions (308, 309, 310) are performed as described above to effect the delivery of an ad creative.

2.3 Use Case #3 (FIG. 3C): Known High Value Impression Consumer, No Platform-Based Auction The Imp Bus 204 performs actions (303, 304) as described above.

The Imp Bus 204 examines each platform-specific ad tag found within the browser header to determine whether the corresponding creative serving opportunity on the requested page is part of a particular impression buyer member's pre-existing media buy. For each creative serving opportunity on the requested page that is part of an impression buyer member's pre-existing media buy, the Imp Bus 204 generates a bid request (e.g., Bid request Exclusive) that provides a multi-faceted characterization of that creative serving opportunity and directs (325) that bid request to the bidder (e.g., Bidder B 210) within the platform that is operating on behalf of that particular impression buyer member (e.g., Impression Buyer Member O 218).

The bidder (in this example, Bidder B 210) that receives the bid request examines the information that characterizes the impression consumer to determine the value of the impression consumer to the impression buyer member (in this example, Impression Buyer Member O 218) for whom the creative serving opportunity constitutes a pre-existing media buy. If the value of the impression consumer exceeds a predetermined threshold, the bidder (in this example, Bidder B 210) selects a creative from a campaign associated with the impression buyer member (in this example, Impression Buyer Member O 218) for whom the creative serving opportunity constitutes a pre-existing media buy, and returns (326) to the Imp Bus 204 a redirect identifying the location of the selected creative. The Imp Bus 204 sends (327) this redirect to the SiteXYZ web server 202. Actions (308, 309, 310) are performed as described above to effect the delivery of an ad creative.

2.4 Use Case #4 (FIG. 3D): Known Low Value Impression Consumer, No Restrictions on Data Sharing, Constrained Platform-Based Auction The Imp Bus 204 performs actions (303, 304) described above. In this example, data retrieved from the server-side cookie store 206 may be shared between impression trading industry members without constraints.

The Imp Bus 204 examines each platform-specific ad tag found within the browser header to determine whether the corresponding creative serving opportunity on the requested page is part of a particular impression buyer member's pre-existing media buy. For each creative serving opportunity on the requested page that is part of an impression buyer member's pre-existing media buy, the Imp Bus 204 generates a bid request (e.g., Bid request Common) that provides a multi-faceted characterization of that creative serving opportunity and directs (335) that bid request to the bidder (in this example, Bidder C 212) within the platform that is operating on behalf of that particular impression buyer member (in this example, Impression Buyer Member Q 222). In general, the bid request includes information that characterizes the impression consumer (e.g., based on data retrieved from the server-side cookie store), the ad space (e.g., based on information associated with the platform-specific ad tag itself), and an auction identifier.

The bidder (in this example, Bidder C 212) that receives the bid request examines the information that characterizes the impression consumer to determine the value of the impression consumer to the impression buyer member (in this example, Impression Buyer Member Q 222) for whom the creative serving opportunity constitutes a pre-existing media buy. If the value of the impression consumer does not exceed a predetermined threshold, the bidder returns (336) the Imp Bus 204 an auction notification which includes a redirect that identifies a location of a reserve creative and a reserve price that other bidders must meet in order to take the creative serving opportunity away from the impression buyer member (in this example, Impression Buyer Member Q 222) for whom the creative serving opportunity constitutes a pre-existing media buy.

Because there are no constraints placed on the sharing of data between impression trading industry members, the Imp Bus 204 may send (337) the previously-generated bid request (e.g., Bid request Common—now considered a secondary bid request) to each of the other bidders (in this example, Bidder A 208 and Bidder B 210) within the platform. Each of those bidders examines the information that characterizes the impression consumer to determine the value of the impression consumer to its associated impression buyer members (in this example, Impression Buyer Member M 214 and Impression Buyer Member N 216 are associated with Bidder A 208, and Impression Buyer Member O 218 is associated with Bidder B 210), and optionally generates a bid response to be returned (338) to the Imp Bus 204.

The Imp Bus 204 first eliminates from contention those bid responses having a bid price that fails to meet or exceed the reserve price included in the auction notification. If all of the returned bid responses are eliminated, the Imp Bus 204 sends (339) the redirect that was included in the auction notification to the SiteXYZ web server 202. If, however, at least one of the returned bid responses meets or exceeds the reserve price included in the auction notification, the Imp Bus 204 identifies a winning bid, and returns (339) to the SiteXYZ web server 202 a redirect that identifies a location of a creative of the winning bid. Actions (308, 309, 310) are performed as described above to effect the delivery of an ad creative.

Suppose, for example, that the impression buyer member (in this example, Impression Buyer Member Q 222) is an advertising agency and the creative serving opportunity on the requested page is part of the impression buyer member's pre-existing media buy for a first advertiser or advertising network. The advertising agency may choose to have its bidder (in this example, Bidder C 212) conduct an internal auction to identify a winning bid from amongst the eligible campaigns of the other advertisers and advertising networks associated with the advertising agency in those instances in which the value of the impression consumer to the first advertiser or advertising network does not exceed a predetermined threshold. Only if the winning bid resulting from the internal auction does not meet the reserve price set by the first advertiser or advertising network for that creative serving opportunity does the bidder (in this example, Bidder C 212) return to the Imp Bus 204 an auction notification as described above.

2.5 Bid Request

As described above, a bid request generally includes information that characterizes the impression consumer (e.g., based on data retrieved from the server-side cookie store), the ad space (e.g., based on information associated with the platform-specific ad tag itself), and an auction identifier. A bid request may further include the following information:

a. Members: If included, a bidder may only consider the campaigns and creatives associated with impression buyer members having identifiers included in the Members array of identifiers.
b. Userdata: The userdata attached to the user's cookie owned by the bidder receiving the request.
c. Frequency: The total number of impressions for this user across the platform.
d. Clicks: The total number of clicks for this user across the platform.
e. Recency: The number of minutes since the last impression for this user across the platform.
f. Session Frequency: The number of impressions in this session for this user.
g. Estimated Winning Bid Price: The price estimated to win the bid, based on predetermined and/or historical criteria (see below).

2.6 Bid Response

As described above, a bid response typically includes a bid price and a creative that are to be served should the bid be identified as the winning bid of a platform-based auction. A bid response may further include the following information:

h. Member ID: This is the identifier of the impression buyer member whose creative is chosen by the bidder from the "Members" array of identifiers in the bid request.
i. Exclusive: This flag ('yes' or 'no') indicates to the Imp Bus that the creative serving opportunity constitutes a pre-existing media buy and the creative provided in the bid response is to be served. No other bidders will be allowed to compete for the creative serving opportunity.
j. No bid: This flag ('yes' or 'no') indicates to the Imp Bus that the bidder has returned a valid response but has chosen not to bid.
k. Price: The price, expressed as a CPM, that the bidder is willing to pay for this impression. If exclusive, this is used only for reporting purposes; if not exclusive, this value represents a reserve set by the bidder.
l. Userdata: Data to attach to the user (by storing in association with the user's platform-specific user-id) if the bid response is selected as the winning bid.
m. Creative ID: The ID of the creative to be served if the bid response is selected as the winning bid.
n. Used Data Provider: Third-party data providers charge a fee when their information is used to target or optimize an ad. Contractually, bidders must accurately report this by setting the appropriate flag (used_3rdPartyA, used_3rdPartyB, etc) in the bid response.

2.7 Result Notification

At the conclusion of a platform-based auction, the Imp Bus 204 may be implemented to generate a result notification for each bidder 208, 210, 212 that submitted a bid response responsive to a bid request. The information included in a result notification may vary depending upon implementation and circumstance. Examples of such information include:

o. Auction ID: An auction identifier that uniquely identifies this particular auction from amongst all of the platform-based auctions that have taken place within the platform.
p. Transaction ID: A transaction identifier that uniquely identifies a transaction in the auction.
q. Valid Bid: This flag ("yes" or "no") reports to the bidder the receipt of a valid bid response r. No Bid: This flag ("yes" or "no") reports to the bidder the receipt of a no-bid response.
s. Impression Won: This parameter notifies the bidder as to whether its bid response resulted in a winning auction and impression served.
t. Impression Won/Deferred: This parameter notifies the bidder that its bid response resulted in a winning auction but serving of its impression is being deferred.
u. Winning Price: This value represents the bid price that won the auction. In some implementations, this parameter is excluded if the reserve price specified by the impression seller member is not met.
v. Bid Price: This value represents the bid price submitted by the bidder in this particular auction.
w. Estimated Winning Bid Price: This value represents a price that was estimated to win this particular auction, based on predetermined and/or historical bid data.
x. Member ID: This value identifies the impression buyer member for whom the bidder operated on behalf of in this particular auction. Typically, this value is provided to the Imp Bus in the bidder's bid response.
y. Bidder ID: This value identifies the bidder used in this particular auction.
z. Response Time: When provided, this value represents the number of milliseconds that elapsed between the sending of a bid request to a bidder and the receipt of a bid response from that bidder. This parameter is excluded if no bid response is received by the Imp Bus.
aa. Revenue Generated: This value represents revenue generated by the sale of an impression.
bb. Impression Consumer: This parameter reports information associated with the impression consumer or the impression consumer's web browser.
cc. Impression Consumer's Response: This parameter reports information associated with the impression consumer's response to a creative that was served.
dd. Impression: This parameter reports information associated with the impression or advertising space.
ee. Creative: This parameter represents or characterizes the creative selected to be served.
ff. Ad Tag: This parameter includes information associated with the ad tag.
gg. Third-party ID: This parameter identifies any third-party data providers that contributed data towards the generation of a bid response.

The information provided in the result notification may be used by a bidder 208, 210, 212 or decisioning subsystem to fine tune or otherwise modify its bidding strategy to better position itself to win future platform-based auctions. Suppose, for example, that a bidder consistently loses a platform-based auction with a bid of $2.00 for a car buyer on nytimes.com/autos. By examining the "Winning Price" information provided in the result notification, the bidder may tweak its future bid price to maximize its potential to win such a platform-based auction without overpaying for the impression. Similarly, by examining the "Response Time" information provided in the result notification, the bidder may determine that its bid response is being received outside of the predetermined response time period set by the Imp Bus 204 and tweak its bidding algorithm to accelerate the rate at which its bid response is generated and returned to the Imp Bus 204.

A bidder can also pass the Imp Bus 204 or transaction management computing subsystem additional information (e.g., a user ID, a user frequency, a campaign ID) to be passed back to the same bidder during a result notification. This additional information can also be useful to the bidder or to the impression buyer member to manipulate bidding strategy or to understand the results of an ad campaign.

2.8 Transparency

From the advertising platform provider's standpoint, there are advantages to preventing impression trading industry members from obtaining detailed information about any one particular impression consumer or creative serving opportunities within the platform. For example, this minimizes the potential for an impression trading industry member to sign up to transact on the platform for a short period of time simply for the purposes of obtaining detailed information about impression consumers, and quitting after a sufficient amount of detailed information has been obtained. To that end, the Imp Bus 204 may be configured to filter the information that is passed between the various impression trading industry members during the course of transaction platform-based auctions.

In Use Case #2, we described a scenario in which restrictions have been placed on the sharing of data retrieved from the server-side cookie store between some of the impression trading industry members. In this use case, for each impression trading member, the Imp Bus 204 examines the restrictions to identify the subset of data retrieved from the server-side cookie store that may be shared with that impression trading member, and generates an impression trading member-specific bid request that includes information that characterizes the impression consumer (e.g., based on the subset of data retrieved from the server-side cookie store that may be shared with that impression trading member).

Here, we describe another way in which the Imp Bus 204 or transaction management computing subsystem may filter the information that is retrieved from the cookie store. In one implementation, the Imp Bus 204 analyzes the entirety of the data retrieved from the cookie store or user data store 206 and provides a somewhat abstracted version of the retrieved data in each impression trading member-specific bid request. Suppose, for example, the retrieved data includes information about the impression consumer's gender, age, zip code, income, and behavioral data. Further suppose, for example, that bidder A previously pushed information into the cookie store to identify this particular impression consumer's gender (gender=male), income (income=$138,000), and behavioral data (behavioral data=likes fishing, likes hunting) only; bidder B previously pushed information into the cookie store to identify this particular impression consumer's age (age=28), zip code (zip code=02130), and behavioral data (behavioral data=buys ski gear) only; bidder C has never pushed information into the cookie store with respect to this impression consumer. Other information in the user data store may have been provided by a third-party data provider, an impression buyer member, and/or an impression seller member. For bidder A, the Imp Bus 204 may generate an impression trading member-specific bid request that includes gender=male, age=25-35; zip code=North East USA; income=$138,000, and behavioral data=likes fishing, likes hunting, likes winter sports. For bidder B, the Imp Bus 204 may generate an impression trading member-specific bid request that includes gender=male, age=28; zip code=02130; income=$100,000-$199,999, and behavioral data=likes outdoor sports, buys ski gear. For bidder C, the Imp Bus may generate an impression trading member-specific bid request that includes gender=male, age=25-35; zip code=North East USA; income=$100,000-$199,999, and behavioral data=likes outdoor sports, likes winter sports. Each bidder is provided detailed information that it has itself pushed to the cookie store via a feedback mechanism through the platform, but is only provided an abstracted version of the remaining information that is retrieved from the cookie store.

In addition to providing an abstracted version of the data retrieved from the cookie store, the Imp Bus 204 may also provide an abstracted characterization of the creative serving opportunity. For example, in lieu of specifying the URL of the page being requested (e.g., http://lodgeatvail.rockresorts.com/info/rr.gcchalet.asp) by the impression consumer's web browser, the Imp Bus 204 may simply provide in the bid request an identifier of a category of the page and site (e.g., high-end ski resort). More generally, the Imp Bus 204 may provide data characterizing an impression, an impression seller member, an impression inventory source, and/or an impression inventory category. In some embodiments, the Imp Bus 204 sends a data retrieval request to an inventory management subsystem operable to manage impression inventory information across multiple impression inventory sources. One example of a scenario in which it is advantageous to obfuscate the creative serving opportunity is as follows: a publisher has a sales force that is tasked with identifying impression buyer members with which to establish a contractual relationship that defines a media buy. An impression buyer member that is aware of the opportunity to obtain this publisher's impression inventory at a lower price through platform-based auctions may choose to bypass the publisher's sales force altogether and take its chances on the open market. This has the effect of reducing the number of media buys that are established between the publisher and the impression buyer member and/or altering the financial worth of the media buy from the publisher's perspective.

In some embodiments, the Imp Bus 204 may provide data uniquely identifying the creative serving opportunity, including data uniquely identifying an impression seller member, an impression inventory identifier, an impression inventory categorization identifier, a universal impression inventory identifier, and/or a universal resource locator.

3 Integration with Third-Party Systems

Figure 5A:
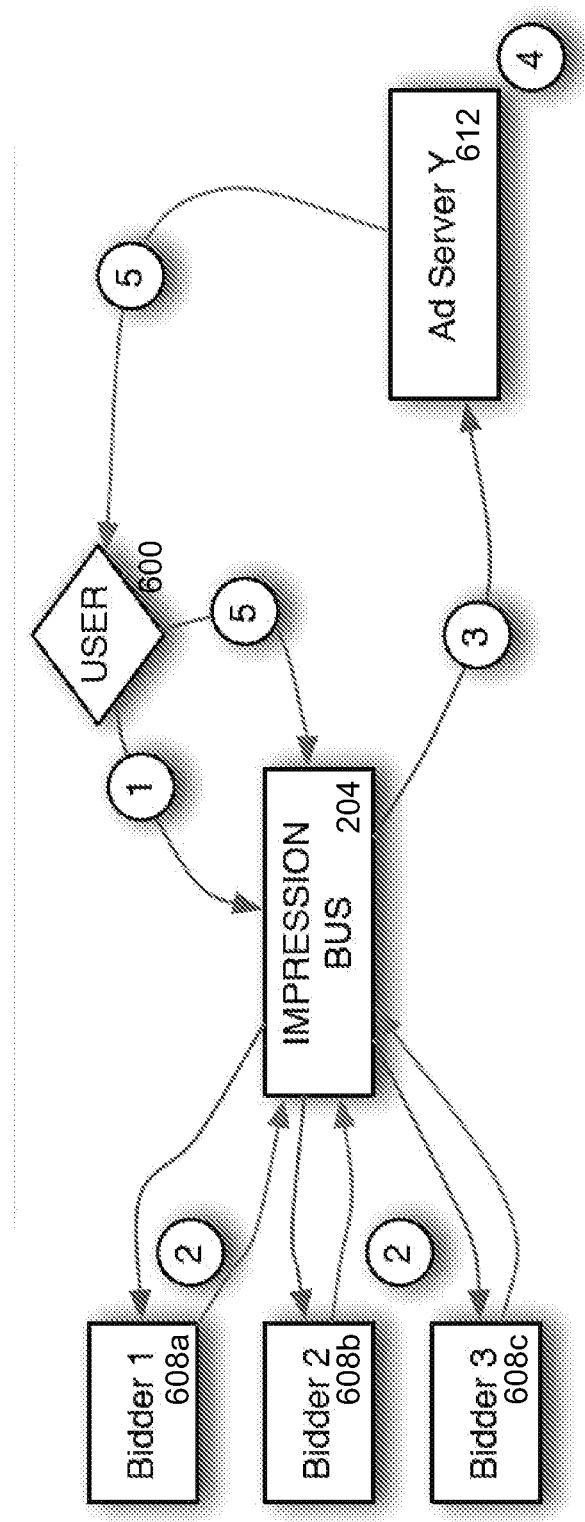
FIGS. 5A and 5B are flow charts for ad calls.

In some examples, tenants of the data center 102 participate in auctions held by third-party systems (e.g., ad exchanges, publisher ad servers) in addition to interactions with the Imp Bus 204. For instance, referring to FIG. 5A, a user 600 generates an ad call to Imp Bus 204 (step 1). The ad call may be, for instance, a preemptible call ("/pt call") that is used to integrate with a third-party ad server capable of performing query string targeting but is unable to make server side calls. The Imp Bus sends bid requests to bidders 608a, 608b, 608c and receives corresponding responses (step 2). The Imp Bus then redirects user 600 to a third-party ad server 612 (step 3) as specified in the referring URL appended to the ad call. Imp Bus 204 inserts a price or price bucket (described below) into the URL via macros. In some examples, a creative is also inserted into the URL; in other instances, the creative is not passed and is instead stored within the browser cookie. Third-party ad server 612 compares the bid received from Imp Bus 204 with internal bids and guaranteed campaigns associated with the /pt tag (step 4). Based on a combination of price and delivery priority, which is a black box algorithm with respect to Imp Bus 204, third-party ad server 612 selects and serves a creative to user 600 (step 5). In the event that the creative passed from the Imp Bus 204 is served, an "lab" call is generated to notify the Imp Bus of successful delivery of the creative (step 5').

Figure 5B:
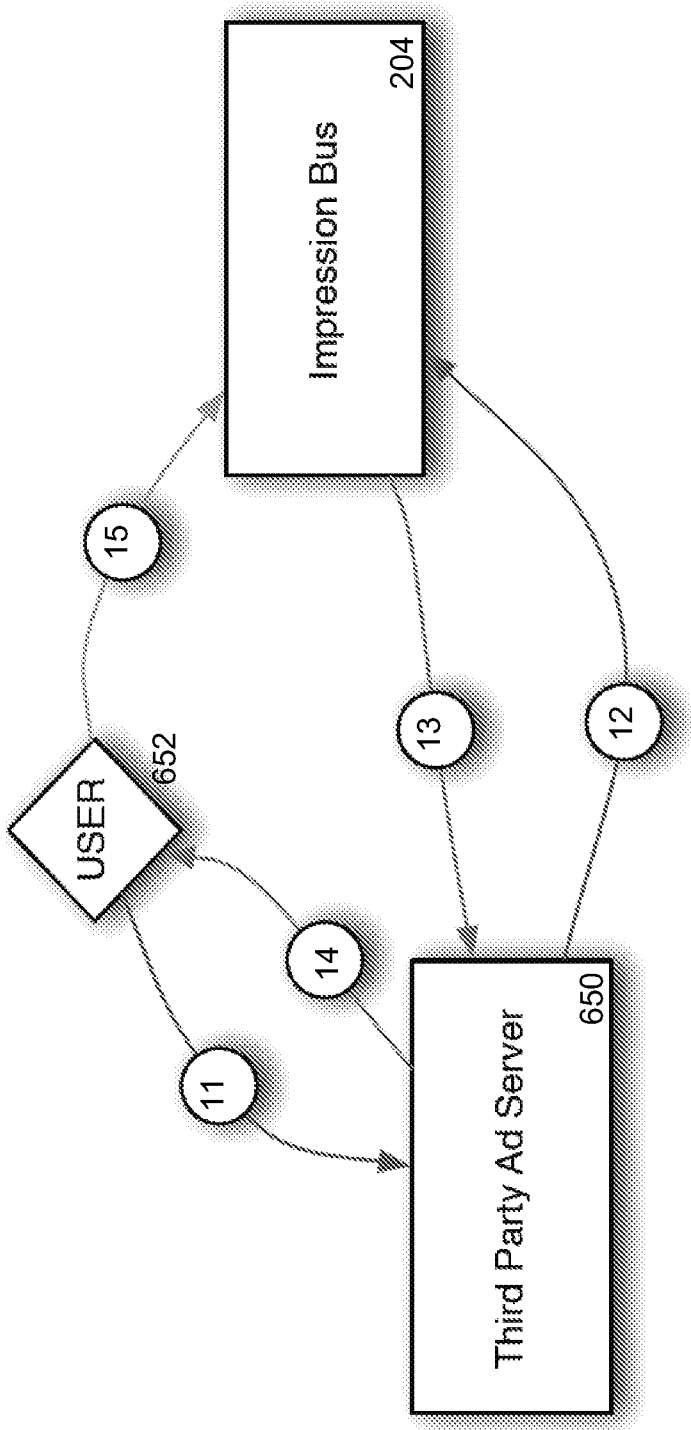

Referring to FIG. 5B, in other examples, a user 652 visits a page with a third-party ad tag (step 11). A third-party ad server 650 gathers user information and sends the information to Imp Bus 204 (step 12). The Imp Bus conducts an auction as described above and returns a creative URL, an auction id, and a bid to third-party ad server 650 (step 13). Third-party ad server 650 writes the auction ID and an "/acb" URL to user 652's cookie so that, if user 652 is shown the creative supplied by Imp Bus 204, the impression may be properly tracked. Third-party ad server 650 selects a creative to serve to user 652 and delivers the ad (step 14). In the event that the creative passed from the Imp Bus 204 is served, an "lab" call is generated to notify the Imp Bus of the third-party auction win (step 15).

In order to ensure a smooth integration with third parties, the Imp Bus 204 passes information, such as a bidding price or a creative, in a format accepted by the known third party (e.g., Right Media Exchange, Google Ad Manager, Double Click, OpenX). Profiles can be created for impression seller members (e.g., publishers) who routinely interact with known third-party systems.

Some third-party systems only accept key-value pairs (e.g., "price=10") that do not encapsulate dollar values. For example, if "price=$1.0594" is passed from the Imp Bus 204 to the Right Media Exchange, the value may not be correctly interpreted for an auction model. To avoid this problem, a tenant can assign small price ranges called "price buckets" to inventory in order for a bid from the Imp Bus 204 to be properly interpreted by a third-party system. The passed prices can be averages and can be edited manually to target campaigns. For example, the Imp Bus 204 can pass "price=10" to the Right Media Exchange and then target a campaign to the key-value pair "price=10" with a CPM of $0.10.

In some examples, priorities can be used instead of price in a third-party system. In a system based on a priority metric, a tenant can create a waterfall of priorities. For example, a campaign targeting "anprice=50" (which represents a payout of $0.50) would be prioritized between the $0.60 existing campaign and the $0.40 existing campaign. The waterfall can appear as follows:

```
3.00 AppNexus anprice=300 campaign
2.80 Existing campaign
2.60 Existing campaign
2.50 AppNexus anprice=250 campaign
2.40 Appnexus anprice=240 campaign
2.30 Appnexus anprice=230 campaign
2.20 AppNexus anprice=220 campaign
2.20 Existing campaign
...
```

When an existing campaign and the AppNexus campaign are the same price, the AppNexus campaign should be prioritized higher if possible in order to maximize revenue from that price point.

Both impression seller members and impression buyer members can create their own price buckets to be used for transactions. For example, an impression seller partner that also participates on the Right Media Exchange can create 20 price buckets ranging from $0.10 to $2.00 in $0.10 increments, in which the price specifies how much will be paid per 1000 impressions. Alternatively or in addition, a publisher (e.g., CNN.com) can create the following price buckets (in units of cents): 0, 10, 12, 14, 16, 18, 20, 22, 24, 26, 28, 30, 35, 40, 45, 50, 60, 70, 80, 90, 100, 110, 120, 130, 140, 150, 160, 170, 180, 190, 200. In either of the previous examples, the values used for the price buckets can be changed as feedback is obtained from the outcomes of auctions.

Third-party systems may specify a preference for the format in which a creative or the price buckets is received. For example, some ad servers may prefer a creative to be presented as a URL, while others prefer that a creative is stored in a cookie or a header (e.g., a JavaScript variable). For example, suppose an impression buyer member, AdCompany123, is selling creatives to three different third-party systems, each with a different preference for how a creative is delivered.

If one of the third-party systems, Exchange ABC, does accept a creative in the form of a URL, an example URL that can be passed by the Imp Bus 204 to Exchange ABC is as follows:
http://ib.adnxs.com/pt?id=1&redir=http%3A//www.SiteXYZ.com/preemp.php%3Fbidprice%3D{BIDPRICE}%26bidurl%3D{BIDURLENC}
in which the macro {BIDPRICE} is replaced with a value from a price bucket and the macro {BIDURLENC} is replaced with a creative URL to be served if the bid is accepted by Exchange ABC.

If another of the third-party systems, Exchange DEF, does not accept a creative as a URL, {BIDURLENC} is not included and instead, the call from the ad server (which in this case is www.SiteXYZ.com.preemp.php) can be http://ib.adnxs.com/acb?member=1&width=728&height=90 and the "/acb" call can read a user's cookies to find a cookie that matches the three criteria of member number, width, and height. Additional or alternative criteria can be included in an ad server call. In some examples, price bucket information can also be stored in the user's browser (e.g., as part of a cookie). Once a match has been made and if the bid has been accepted, Exchange DEF can serve the ad to the user.

If the final one of the three third-party systems, Exchange MNO, does not accept a creative as a URL and prefers a header-based storage to a cookie, {BIDURLENC} is not included and the creative can be stored as a javascript variable: an_ads['a300x250']=http://ib.adnxs.com/ab/. In such a scenario, the ad server (e.g., www.SiteXYZ.com/preemp.php) can make the following call:

```
<script>
document.write('<script type="text/javascript" src="'
+ unescape(an_ads["a300x250"]) + '"></scr' + 'ipt>');
</script>
``` in which "a300x250" can be a predetermined key for that particular placement and may not necessarily include size information of the creative. Price bucket information can also be stored as a javascript variable.

In any of the three examples given above, the Imp Bus 204 can represent an impression buyer, AdCompany123, to a third-party system (e.g., Right Media Exchange). The Imp Bus 204 can be integrated with the ad server of the impression buyer in part by changing an existing alias or a canonical name (CNAME) to point to the Imp Bus instead of or in addition to the impression buyer itself.

Currently, many companies of a third-party system (e.g., Right Media Exchange) have a CNAME set up to ad.yieldmanager.com. This allows the company to give out ad tags which look like "http://ad.siteXYZ.com/st?id=123&size=728x90" instead of "http://ad.yieldmanager.com/st?id=123&size=728x90". By changing the CNAME to point to ib.adnxs.com, the Imp Bus 204 can run an auction, interpreting the existing parameters and redirect the impression to yieldmanager such that the new impression looks like: ad.siteXYZ.com→ib.adnxs.com→ad.yieldmanager.com In some examples, as part of the redirect, the Imp Bus 204 can add a correct query string parameter in order to perform additional processes (e.g., perform a price check auction). Due to the CNAME change, the Imp Bus 204 has to correctly interpret (or correctly redirect) non-impression information as well (i.e., pixel calls, or non-standard calls to the alias).

4 Additional and Alternative Embodiments

4.1 Preemptive Auctions

In the use cases described above and depicted in FIGS. 3A-3D, each ad call received by the Imp Bus 204 is a server-side ad call. The advertising platform also accommodates client-side ad calls.

In one example scenario, an impression seller member desires to do a price check on its impression inventory. When an impression consumer's web browser navigates to a web page hosted by a server operable by the member, the server returns to the impression consumer's web browser a snippet of HTML, generally either some JavaScript or an IFRAME that tells the browser to make a client-side ad call to the Imp Bus 204. The Imp Bus 204 receives the client-side ad call and performs a platform-based auction (as described above) to identify a winning bid. The Imp Bus 204 returns to the impression consumer's browser a URL ("winning bid URL") and a price. The Imp Bus 204 also sends to the bidder of the winning bid a "won but deferred" notification, which identifies to the bidder that although its bid is the winning bid, the serving of the impression is being deferred for the moment.

The impression consumer's web browser forwards information characterizing the price of the platform-based winning bid to a server ("member server") operable by the member. The member server implements its own logic to determine (perhaps in part based on the price of the platform-based winning bid) whether to serve the ad creative of the platform-based winning bid or serve its own ad creative (e.g., a default ad creative from its own ad server and/or an ad creative associated with a winning bid of an auction conducted by the member server itself). If the member server determines that the ad creative of the platform-based winning bid is to be served, the member server returns to the impression consumer's web browser a snippet of HTML, that tells the browser to point to the winning bid URL. When the winning bid URL loads, the Imp Bus 204 logs that an ad creative resulting from a platform-based auction is to be served and returns to the impression consumer's web browser a redirect to the location of the ad creative to be served.

Over a period of time, use of preemptive auctions enables the impression seller partner to obtain information (e.g., the price of the platform-based winning bids) sufficient to determine the true market value of certain creative serving opportunities. This true market value may subsequently be used to set the reserve price for the respective creative serving opportunities.

4.2 Estimated Minimum Price Reduction

In some examples, after a platform-based auction, the Imp Bus 204 can pass a bid related to the platform-based winning bid and optionally location information for the creative (e.g., a URL, a JavaScript variable, a cookie) to a third-party system (e.g., an advertising exchange) to decide how to fill an ad call. In this scenario, the Imp Bus 204 functions as a participant on the third-party system, presenting a value related to the internal winning price and optionally the internal winning creative to compete against other advertisers to fill the original ad call.

Should the bid passed by the Imp Bus 204 be chosen as the winner by the third-party system, the ad call would be passed back to the Imp Bus and the winning bidder's creative would be served.

The Imp Bus 204 can use a rule, or a set of rules, to determine the value of the bid that is passed to the third-party system. A well-chosen value will both help the bid to be competitive in future auctions held by third parties and help the impression seller member earn higher revenue from the bid.

As an example of how a pricing strategy can affect future auctions, consider if a bidder representing Toyota® bids $5 and a bidder representing MasterCard® bids $3 for a particular impression in a platform-based auction. Suppose the Imp Bus 204 is implemented with a standard second price auction mechanism. In such a scenario, the winning bid is a price equal to the second-highest bid, which is $3. If the bid of $3 is passed on to a second ad exchange that is operating its own auction mechanism, the $3 bid would lose to a $4 bid, even though Toyota® was willing to pay $5 for the impression. Alternatively, suppose the Imp Bus 204 is implemented to pass on the highest bid from the platform-based auction to a second ad exchange or to a second platform-based auction. In such a scenario, the $5 bid would beat a $4 bid. However, if the platform-based auction performed by the Imp Bus 204 had required Toyota® to pay only $3, the publisher would lose a dollar.

To mitigate these issues, the Imp Bus 204 can use smarter rules that are better informed by market data to determine what amount to pass on for a winning bid. Instead of passing a value of a winning bid that is equal to the second-highest bid or to the second-highest bid plus a fixed (or variable) percentage, the Imp Bus 204 can implement an estimated price reduction mechanism that is determined by observing historical bids and their success or failure in the third-party system.

In some examples, after an ad call arrives, the Imp Bus 204 can estimate a bid price that is likely to win the ad using analytics on impressions over time, including one or more of user frequency, time of day, publisher's site, or other information. The bid price estimate may also be based on a dynamically varying probability threshold value dependent on a high success rate criterion such as an estimated clear price (ECP; e.g., a success rate of 70-80%) or a moderate success rate criterion such as an estimated average price (EAP; e.g., a success rate of 40-50%). In some instances, the ECP and EAP are determined based on historical data of win rate as a function of price, such as using a bid curve plotting the historical data. The estimated price can automatically be included in the bid request that is sent to bidders, allowing the bidders to make a more well-informed decision to bid above or below the estimated price. While a bid below this threshold may be submitted to third-party systems, the risk of losing the auction in the publisher's ad server would be greater than if the bid were greater than or equal to the estimated price. If the winner's bid is above the estimated price, the bid price sent on to the next auction can equal either the second-highest bid or the estimated price, whichever is higher. If, instead, the winner's bid is below the estimated price, the bid price can equal the winning bid (i.e. no price reduction).

As an example, suppose an ad call for the nytimes.com is to be decided by a third-party system. In a first-round auction, the estimated clear price for this ad call is calculated by the Imp Bus 204 to be $4. The two highest bids for this auction are $5 by Diesel® and $6 by Armani®. Armani® wins the auction and the Imp Bus 204 sends a bid of $5 for Armani® to the third-party system for the next auction. As another example, suppose that instead, the two highest bids for the nytimes.com auction had been $3 by Diesel® and $5 by Armani®, the estimated price still at $4. Armani® wins the auction and the Imp Bus 204 sends a bid of $4 for Armani® to the third-party system for the next auction. As another example, suppose that instead, the two highest bids for the nytimes.com auction had been $2 by Diesel® and $3 by Armani®, the estimated price still at $4. Armani® wins the auction and the Imp Bus 204 sends a bid of $3 for Armani® to the third-party system for the next auction.

In some examples, estimated prices can be used outside the context of an actual auction in order to help develop a bidding strategy.

4.3 Bidder-Specific Debugging

If a bid request is sent to a bidder and the bidder chooses not to bid (e.g., replies with a $0 bid), the reasons for the $0 bid (e.g., campaign spans non-US inventory, segment targeting) would be unknown to the Imp Bus 204 and to other auction participants. A debug log is a tool that can be used by any of the tenants of the data center 102 to better understand the auction process performed by the Imp Bus 204 or to test that a bidder is functioning properly when exposed to real traffic and volume. A debug tool can be built into a bidder framework open source code and/or an Imp Bus "debug text."

In a call for an impression, a "debug" parameter can be added that shows communications between the Imp Bus 204 and all active bidders during an auction that is run as a "debug auction." All bidders will be informed that an impression is flagged as a "debug impression," and all participants will proceed in a standard way, with the exception that each bidder will log text related to a bidder's response that is unique to that given impression. As the auction proceeds, all decisions are logged for each bidder as it proceeds from one advertiser to a first campaign and to a second campaign and so on. When the Imp Bus 204 sends a bid request to a bidder during a "debug auction," the bidder replies to the Imp Bus with all of its debug text. If a bidder responding to the Imp Bus 204 appears to malfunction (e.g., the bidder uses a malformed JavaScript object notation or sends an invalid response), the debug log will display errors.

Below is an example debug log with a description of how the Imp Bus determines the winning bid. Actual log entries are in italics.

Stage 1: Imp Bus 204 is Contacted

1. The TinyTag on the publisher page causes the browser to contact the Imp Bus 204. Debug logs may be obtained by calling "http://ib.adnxs.com/tt?id=yourtagid&debug=1" Because the Imp Bus 204 can be a cluster of load-balanced instances, the instance "impbus-01" is contacted in this example. "Sand-07" indicates the current development version of Imp Bus 204 and API software, and "NYM1" indicates the data center in which this activity is taking place.

Impbus impbus-01.sand-07.nym1:8002

2. The referrer (the page where the TinyTag originates) and the URL class (whitelist, blacklist, greylist) are displayed.

Blank referrer. Inventory greylisted.
      Inventory class: greylist

3. The information contained within the TinyTag is displayed.

Standard 728x90 tinytag 11—member 5, reserve $0.000, tag data (null)

4. The Imp Bus 204 assigns an "auction ID" to this transaction, and the user's geographical information and ID are collected from his cookie.

Auction ID: a00244e7-919c-4c0e-abd4-af98fc295b8d
      Geo: US NY 501
      User ID: db154e9c-7aab-4c12-9661-1df3b8e78cfa 5. Third-party data providers are contacted. In this case no third-party data is available.

Skipping datran phase—not configured or saturated
      No IXI data found
      Data provider phase complete—0 ms elapsed
   Stage 2: Owner Phase 6. If the tag's owner is associated with a bidder, that bidder is sent a bid request first. In this case the owner is associated with Bidder 9.

sending bid request/Bidder09/bidder_09.php to bidder 9 at x.xx.xxx.xxx:xx
      Waiting for owner to bid
      Response from bidder 9 received in 1 ms
         Bidder 9:
         a00244e7-919c-4c0e-abd4-af98fc295b8d: failed—
         Creative does not belong to response member id
         Owner phase complete—2 ms elapsed
      Stage 3: Bidding Phase 7. Bid Requests are sent to all listening bidders. The bidders pass back Bid Responses and the Impression Bus validates member IDs and computes net prices based on the tag's revshare with the Imp Bus 204 and any bidder fees included in the Bid Response.

Response from bidder 13 received in 0 ms
      Total revshare for member 21: 95.00%
      Bidder fees for member 21: $0.000 (revshare 0.0%, $0.000 min CPM)
      Bidder 13:
      a00244e7-919c-4c0e-abd4-af98fc295b8d: Member 21 bid $4.200 (net $3.990)
   Response from bidder 9 received in 1 ms
      Total revshare for member 3: 95.00%
      Bidder fees for member 3: $0.388 (revshare 5.0%, $0.000 min CPM)
      Bidder 9: a00244e7-919c-4c0e-abd4-af98fc295b8d: Member 3 bid $7.770 (net $7.012)
   Response from bidder 8 received in 50 ms
   Bidder 8: Connection throttled, failed, or timed out
   Stage 4: Auction Winner Determined 8. The auction winner is determined by ranking the net bids above. Here we have net bids of $3.990 and $7.012. The $7.012 bid wins, but the price is reduced to the second bid price of $3.990. Bidder fees and exchange fees are added on to $3.990 to make a gross price of $4.421. The buyer will pay $4.421 (this shows up as $4.421 in reporting as buyer_spend) and the seller will receive $3.990 (this shows up as $3.990 in reporting as seller_revenue).

Bidding phase complete—50 ms elapsed
   Auction a00244e7-919c-4c0e-abd4-af98fc295b8d result: SOLD
      Winning bid: $7.770; Tag min: $0.000
         Second bid: $3.990
      Net winning price: $3.990; Gross price: $4.421; Bidder fees; $0.221
      Member 3 creative 28 has the highest net bid: $3.990
   Auction Timing
   The Imp Bus 204 displays how long each stage of the auction took.

Auction timing:
  Init phase: 0 ms
  DP phase: 0 ms
  Owner phase: 2 ms
  Bid phase: 50 ms
  End phase: 0 ms
  --------------------
  Total: 53 ms
Auction complete A debug log can be customized in order for each independent decisioning engine associated with a bidder to output its internal debug messages for any given auction. This can be important, for example, because each bidder is independently determining its response (e.g., choosing creative A over creative B, excluding campaign X) and the bidder's metrics for each response can be unique to that bidder.

An example custom debug log from one bidder can include the following text:
  Member 3:
    Available—adding
  Member 13:
    Available—adding
  2 available member(s)
    Tag 1307:
    Member 3
    Advertiser 2
    Campaign 12
  Bans URL—skipping
    Campaign 13
  Does not meet reserve price—skipping
    Campaign 14
  Does not meet reserve price—skipping
  No eligible campaigns—skipping
  No eligible advertisers—skipping
    Member 13
    Advertiser 1
    Campaign 1
  Bans segments—skipping
  No eligible campaigns—skipping
    Advertiser 5
  No eligible campaigns—skipping
  No eligible advertisers—skipping
  No eligible members—skipping Another example custom debug log can include the following text:
  16: 32:11 (DEBUG) Decoded bid request:
    16:32:11 (DEBUG) Partner id is None
    16:32:11 (DEBUG) *** failed rule for li 432, (Match rule for segments. Include items set(['104']) Exclude items set([ ]))
    16:32:11 (DEBUG) *** failed rule for li 446, (Match rule for segments. Include items set(['599']) Exclude items set([ ]))
    16:32:11 (DEBUG) *** failed rule for li 448, (Match rule for segments. Include items set([599]) Exclude items set([ ]))
    16:32:11 (DEBUG) *** failed rule for li 426, (Match rule for segments. Include items set(['104']) Exclude items set([ ]))
      16:32:11 (DEBUG) Valid line items are
        16:32:11 (DEBUG) No found items
    16:32:11 (DEBUG) Bidding response is empty. None found
    16:32:11 (DEBUG) BidRequest/Response is {'auctionID': '43a5516f-2dc8-43fa-$a$549-5432d9201278', 'request_data': {'tags': [{'reserve_price': 1.0, 'auction id': '43a5516f-2dc8-43fa-a549-5432d9201278'; 'tag_format': 'iframe', 'id': 1307, 'size': '300x250'}], 'bid_info': {'accepted_languages': 'en-us,en;q=0.5'; 'user_id': 'fe3ca2dd-3ac9-4427-ac89-a173d524f998', 'inventory_class': 'class_1', 'city': 'New York', 'url': 'babynamenetwork.com', 'country': 'US', 'region': 'NY'; 'dma': 501, 'within_iframe': False, 'time_zone': 'America/New_York'; 'total_clicks': 0, 'postal_code': '10012', 'user_agent': Mozilla/5.0 (Macintosh; U; Intel Mac OS X 10.5; en-US; rv: 1.9.0.6) Gecko/2009011912 Firefox/3.0.6, 'no_flash': False, 'session_imps': 0, 'mins_since_last_imp': 1112, 'ip_address': '64.59.43.186'; 'total_imps': 27, 'no_cookies': False}, 'timestamp': '2009-03-03 21:32: 10', 'debug_requested': True, 'members': [{'id': 30}, {'id': 49}], 'allow_exclusive': False}, 'isp': 'ELINK COMMUNICATIONS', 'uid': 'fe3ca2dd-3ac9-4427-ac89-a173d524f998', 'ectr': 0.0, 'exchange_owning_partner_id': None, 'ip': '64.59.43.186', 'tag': None, 'user_data': {'adnexus_id': 'fe3ca2dd-3ac9-4427-ac89-a173d524f998'{, '_logVersion_': 1.0, 'creative_frequency': 0, 'cost': 0, 'clientID': 0, 'size': (300, 250), 'partners': [{'id': 30}, {'id': 49}], 'placementID': 0, 'time bucket': '1:21', 'creative_recency': 1099511627776, 'segments': [ ], '_eventType_': 'BidRequest', 'publisher_item': None, 'dma_code': '501', 'subID': None, 'insertionID': 0, 'other': { }, 'tag_format': 'IFRAME', 'partnerID': 0, 'creativeID': 0, 'bid': 0, 'zip code': '10075', 'inv_group': None, 'second bid': 0, 'client frequency': 0, 'clickURL': None, 'inv_unit': None, 'win_frequency': { }, 'publisher_insertion_order': None, 'adnexus_partner_id': 0, 'interface': 'adnexus', 'inv_source': None, 'testCreativeID': None, 'client_recency': 1099511627776, 'no_bid': True, 'tinytag_id': 1307, 'campaign_recency': 1099511627776, 'pubRedirectUnencoded': False, 'language': 'EN', 'url': 'babynamenetwork.com', 'country': 'usa', '_utcMessageTime_': '2009-03-03T21:32:11.049988', 'campaignID': 0, 'campaign_frequency': 0, 'frequency': '{ }', 'exclusive': False, 'lineitemID': 0, 'bid_request_url': None, 'inv_size': None, 'os': 'MAC_OS_OTHER', 'region': 'usa_ny', 'browser': 'FIREFOX_3'}----

4.4 Logging and Reporting

A tremendous amount of information passes through the Imp Bus 204 or transaction management computing subsystem per impression inventory transaction. The Imp Bus 204 may be implemented to log various pieces of information in the data store 230 for each and every impression inventory that is transacted within the platform. Such log data may include information specific to the impression consumer (e.g., demographic, psychographic, and behavioral data); information specific to the impression consumer's web browser (e.g., browsing history or purchasing history); information specific to the ad tag, creative serving opportunity, or combination thereof; information specific to the creative that was selected to be served; information representative of the impression consumer's response to the creative that was served (e.g., clickthroughs and conversions); information representative of the transactional nature of the platform-based auction itself (e.g., identifier for each bidder that responded and what the bidder responded with in terms of creative and price, response time of each bidder, which bidder elected to no bid, and identifier for each third party data provided who contributed data that was used by each bidder to optimize or otherwise generate a bid response); or information related to a third-party data provider that contributed data towards the generation of a bid response.

The Imp Bus 204 collects detailed information about individual platform-based auctions on an on-going basis. Because the Imp Bus 204 collects and logs a large amount of data, the file sizes of the logging tables stored in the data store can grow large. If all of this information is stored for a long time, it quickly consumes too much disk space. To conserve disk space and to keep these files small, the Imp Bus 204 periodically can summarize in real-time the stored data and re-log it to a summarization table. The summarized versions of the data that are re-logged include far less detail about the individual platform-based auctions. However, through careful selection of summarization parameters, the data summarization provides useful snapshots of the nature of the platform-based auctions that are occurring during a given time interval.

In some examples, these summarized versions or the original, non-summarized versions of the data may be freely obtained by any impression trading industry member without cost. In other examples, these summarized versions or the original, non-summarized (e.g., impression-level) versions of the data may be obtained for a cost that is dependent on the nature of the contractual relationship agreed upon between the advertising platform provider and the respective impression trading industry members. As an example, a first bidder establishes a "basic" value service relationship with the advertising platform provider and is entitled to a report of activity within the platform ecosystem within a 24-hour period; a second bidder establishes a "moderate" value service relationship with the advertising platform provider and is entitled to a report of activity within the platform ecosystem within a 1-hour period; a third bidder establishes a "premium" value service relationship with the advertising platform provider and is entitled to a report of activity within the platform ecosystem within a 15-minute period. The timing of updates provides the third bidder a market advantage in terms of obtaining information and making changes to its bidding strategies in real time as compared to that of the first and second bidders.

The above-described information that is collected by the Imp Bus 204 can be pushed to impression trading industry members at specific intervals, as specified in the contractual relationship between the advertising platform provider and the industry member. Alternatively or in addition, the Imp Bus 204 can update its databases at predefined intervals (e.g., every 10 seconds, every 30 seconds, every minute, every hour) or in response to a change in information related to a platform-based auction (e.g., behavioral data related to an impression consumer, information specific to the ad tag or winning bid or selected creative, information related to third-party data provided).

The Imp Bus 204 can provide incremental updates to users using batch generation, which allows users to pull updates at regular intervals or sporadically or whenever a database is reported to have changed. The Imp Bus 204 can provide updates in real-time, in a ticker format, in various levels of granularity, such as impression-level updates or aggregate updates. For example, the number of U.S. impressions for an ad campaign can be streamed to an impression buyer member, an impression seller member, a third-party data provider, or to another auction participant. Alternatively or in addition, data can be streamed on a per impression basis, made available in a textual log format or as a queryable database table.

4.5 Batch Services for Bidders

In some examples, an impression seller member's preference for ad quality (e.g., an offer type, preferred creatives) can be monitored by bidders by using batch generation. As an impression seller member can approve a large number of potential ads (e.g., 10,000, 100,000), it is not realistic to pass all of them to a bidder. Instead, an impression seller member can set up a target ad profile in which preferences (e.g., preferred creatives, brand/offer-type standards, trusted and brand members) are stored and can be changed by the impression seller member. For example, the website nbc.com could specify a preference for an ad in English and related to tax preparation to be displayed for the months of February and March.

An impression seller member (e.g., a publisher) associated with a large multimedia stream (e.g., the news website CNN.com) can set up a profile for each of its multiple multimedia streamlets (e.g., CNN.com/entertainment, CNN.com/health, CNN.com/technology, and CNN.com/travel). An identification number can be assigned to each profile created by a publisher and can be shared with other tenants (e.g., bidders).

Whenever a publisher changes information in a profile (e.g., a preferred ad content, a geographical preference, a preferred brand associated with the creative, an unwanted type of creative), the Imp Bus 204 can update (e.g., using incremental batch generation) an ad quality process. After such an update, when a bidder pulls an ad quality process, they can also pull an ad profile service that pulls any publisher updates upon request or within a predefined interval (e.g., 10 seconds, 30 seconds, 10 minutes, 30 minutes, 1 hour) into the bidder's cache. Thus, bidders can have a full view of imp bus standards and can avoid wasted bids on creatives that may be rejected by the publisher.

In some examples, foreign currency-based transactions can be supported within the platform and a currency clearinghouse computing subsystem of the Imp Bus 204 can serve as a clearing house for all currencies used by tenants. To aid participants of an auction in generating bids, the Imp Bus 204 can pull a feed of exchange rates from a source (e.g., x-rates.com, OANDA Rates®, FXSolutions.com) that is sampled at different times (e.g., 30 min, hourly) and stored within the platform. Bidders can pull currency updates at different intervals (e.g., 20 seconds, every minute) to ensure their bids are appropriate for the currency used.

For example, if Volkswagen® wanted to place an ad for the new Passat™ on the news websites lemonde.fr, welt.de, bbc.co.uk, and nytimes.com, bidder transactions would take place in euros, British pounds, and U.S. dollars. If the U.S. dollar-euro exchange rate were to suddenly change from 1.26 to 1.45 dollars per 1 euro, a bidder representing Volkswagen® and paying in euros should lower the bid to place an ad with nytimes.com.

4.6 Hosted Bidder

In some implementations, the advertising platform includes a hosted bidder framework that enables an impression buyer member to provide a bid guide of API-driven bidding rules (also known as decisioning rules) to the platform on an ad hoc basis. These member-specific bidding rules will subsequently be executed by a hosted bidder operable by the advertising platform provider on behalf of the impression buyer member during the platform-based auctions. The hosted bidder removes the need for an impression buyer member to engage a third-party Bidding Provider to operate on its behalf or to set up and configure its own bidder within the platform—a process that can be difficult and time consuming for the impression buyer partner.

Generally, a bid guide explicitly states how much the impression buyer member will pay based on specific targeting parameters. Each bid guide is a pricing matrix for the data points the impression buyer member values. For example, a bid guide may specify that an impression buyer member will bid $1.00 for a U.S. impression of size 728x90, and $0.50 for an international 728x90 impression.

The key to successful bidding is frequent updating of bid prices based on performance data. Accordingly, an impression buyer member may use the reports generated by the Imp Bus 204 to view bid performance and upload modified bid guides on an on-going basis.

4.7 Bidder Instances

A data center tenant that operates a bidder within the platform may deploy one or more instances of a bidder at any given time. In a typical implementation, each bidder instance runs on a machine that is uniquely addressable within the platform via an IP address and port numbers.

The Imp Bus 204 may be implemented with load balancer functionality that enables the Imp Bus 204 to spread bid requests between multiple instances of one or more bidders without requiring a dedicated load balancer hardware device to be deployed within the platform. The Imp Bus 204 maintains a list of bidder instances and corresponding machine IP addresses and port numbers. In some examples, in order to load balance across bidder instances, the Imp Bus 204 sends a ready call to each bidder instance periodically (e.g., every 100 milliseconds, every second, every five seconds, every 10 seconds, every 30 seconds) and monitors the queue responses from each individual bidder instance. The Imp Bus 204 throttles requests to any bidder instance that either fails a "ready check" or appears to be unresponsive to or overloaded with requests. The Imp Bus 204 spreads the remaining load (e.g., processing of subsequent bid requests) among the other instances of that bidder.

Integrating the load balancer functionality within the Imp Bus 204 provides numerous advantages from a connection-handling perspective, thereby increasing performance and reducing network bottlenecks. This arrangement removes one layer of complexity and latency that would exist in the internal network of the platform if a bid request were instead routed from the Imp Bus 204 to a dedicated load balancer hardware device, and then to a machine on which a bidder instance is run.

5 Bidder RevShare/Min CPM

A minimum cost per thousand impressions, or CPM, can be used as a minimum threshold for buyers' bids. If a bid is below this threshold, either with or without a reduction in price (e.g., due to bidder, publisher, exchange, and/or data provider fees), it can be removed from consideration.

For example, Toyota® can bid $2.50 for a creative to be served on CNN.com and a bidder representing Toyota® can have a CPM fee of $0.20. If the bid process for the creative is reduced to an amount that is below the bidder's CPM fee (e.g., the bid is reduced to $0.10), there would not be enough money left to pay the bidder its fee. To prevent this problem, the Imp Bus 204 can set a minimum CPM, which can be unique to a bidder and can be changed in real time from transaction to transaction. In some examples, a bidder can have a contract with each of many advertisers, and each contract can set the minimum CPM between the bidder and advertiser.

6 Custom Macros

Typically, an impression buyer or ad server stores information related to a creative or an impression (e.g., a price paid in cents for an impression) and creates one or more macros that can store this information in a preferred format. For example, the Imp Bus 204 can upload a creative, automatically fill in a value (e.g., a value for the price paid in cents for the impression), and pass on this value to an ad server or record it in a database.

Having the Imp Bus 204 create a separate, distinctly-named macro for each impression buyer member can be cumbersome, especially when a member has many values or uses many ad servers.

An alternative is to have an impression member buyer or its associated bidder set up, name, and store one or more macros within a creative. When the bidder responds to a bid request from the Imp Bus 204, the bidder can pass the Imp Bus a string that contains at least a value and a name, and the Imp Bus can fill in the information as specified within the macro. The Imp Bus 204 serves as a conduit for the information and does not dictate the specifics of the macros or the macro names.

The Imp Bus 204 can pass information related to a platform-specific user ID or information about a given impression to the bidder. The Imp Bus 204 can obtain the information from a variety of sources, such as the cookie store 206, an ad tag, a publisher, a third-party data providers, a bidder's user data. Bidders can interpret the passed information dynamically.

For example, for a given impression, the Imp Bus 204 can include in a bid request specific values for a user's session frequency and for the user's income. The bidders will be sent a bid request with the following parameters:

```
{"bid_request":{
...
"income":"72,000",
"session_imps":16,
...
}}
```

If the bidder is interested in this data, it can set up creatives using macros for each data point, for example: ${USER_INCOME} and ${SESSION_FREQ}. The bidder can respond to an impression in such a way that replaces the values in a creative:

```
"custom_macros":[{"name":"USER_INCOME",
"value":"72,000",{"name":"SESSION_FREQ", "value":16}],
```

7 One Implementation of the Imp Bus

Figure 4:
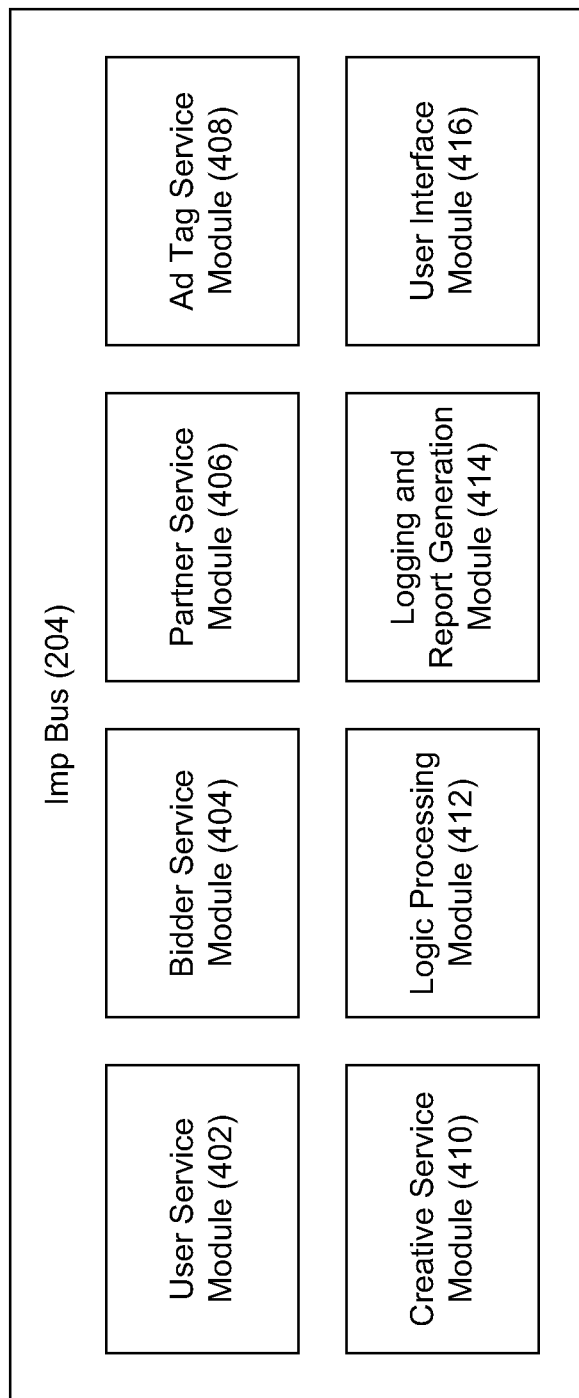
FIG. 4 shows example implementations of an Imp Bus.

FIG. 4 shows an implementation of the Imp Bus 204 that includes a host of API service modules (those depicted include a User Service module 402, a Bidder Service module 404, a Member Service module 406, an Ad Tag Service module 408, and a Creative Service module 410), a Logic Processing module 412, a Logging and Report Generation module 414, and a User Interface module 416.

The User Service module 402 enables the advertising platform provider to manage users within the platform. In this context, a "user" typically refers to a person who is authorized to act on behalf of an entity (e.g., an impression trading industry member or the advertising platform provider itself) in a predetermined capacity. A user authorized to act on behalf of the advertising platform provider may interact with the User Service module of the Imp Bus to add additional users or modify existing users.

The Bidder module 404 enables the advertising platform provider to add bidders to the platform or modify fields (e.g., IP address of bidder within a particular data center, port for bidder traffic in a particular data center, URI to which bid requests are sent, URI to which request notifications are sent) associated with existing bidders.

The Member Service module 406 enables the advertising platform provider to add impression buyer members and impression seller members to the platform. In some examples, each impression buyer/seller member is required to establish a contract with the advertising platform provider independent of its association with its bidder(s). This contract establishes financial terms, credit facilities (if applicable), and binds the member to the terms and conditions of the advertising platform provider (e.g., with respect to content quality, use of personally identifiable information, etc).

The Ad Tag Service module 408 enables the advertising platform provider to manage platform-specific ad tags, for example, viewing platform-specific ad tags associated with a particular impression seller member, adding a new platform-specific ad tag, and modifying an existing platform-specific ad tag associated with a particular creative serving opportunity.

The Creative Service module 410 enables the advertising platform provider to manage creatives at different levels: (1) on an impression buyer member level: identify all creatives associated with a particular impression buyer member; and (2) on a creative level: a human user acting on behalf of the advertising platform provider may examine attributes of a particular creative. Examples of such attributes include the URL of the creative, a brand of the impression seller member associated with the creative, the type of creative (e.g., image, flash, html, javascript), the identifier of the bidder that added this creative, the timestamp that the URL of the creative was last checked to verify its existence and authenticity, to name a few. The Creative Service module 410 may also enable a human user acting on behalf of an impression seller member to preview an ad creative and approve it to be run.

The Logic Processing module 412 includes decisioning software that enables the Imp Bus 204 to process received ad calls, generate and send bid requests, and process returned bid responses to identify an action to be taken (e.g., send additional bid requests, select a winning bid, and return a redirect to the web delivery engine that originated the ad call), to name a few.

The Logging and Report Generation module 414 implements various techniques for logging detailed information about platform-based auctions in the data store and generating summarization reports of varying levels of granularity as required and/or requested by authorized users within the platform.

The User Interface module 416 implements techniques that enable a user within the platform to interact with the Imp Bus through a user interface (e.g., a graphical user interface) of a client computing device (e.g., a web-enabled workstation or a mobile computing device).

Other modules, components, and/or application may also be included in the Imp Bus.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It is to be understood that the foregoing description is intended to illustrate and not to limit the scope of the invention. For example, although the examples provided in this description refer generally to multi-tenant server-side user data stores, the advertising platform may also be implemented to work in conjunction with a multi-tenant client-side user data store. Further, although the examples provided in this description refer generally to a server-side advertising call, the advertising platform may also be implemented to receive client-side advertising calls and/or a combination of client-side and server-side advertising calls.

What is claimed is:

1. A method, comprising:
   generating, by a transaction management computing subsystem including a processor, according to restriction information, a plurality of bid requests, wherein the restriction information is obtained from an ad tag associated with a page request, wherein the plurality of bid requests characterize a user according to data retrieved from a user data store, wherein the data is retrieved from the user data store according to a user identification (ID), wherein the user ID is included in a browser header, wherein the browser header is obtained from the page request, wherein the page request is supplied to a web server by a web browser operating from a computing device of the user, wherein the web server facilitates publishing one or more web pages, wherein the plurality of bid requests further characterize one or more ad spaces of a web page associated with the page request, wherein a first bid request of the plurality of bid requests comprises first characterizing information of the user, wherein a second bid request of the plurality of bid requests comprises second characterizing information of the user, and wherein the first characterizing information is different from the second characterizing information;
   selecting, by the transaction management computing subsystem, at least a first decisioning subsystem and a second decisioning subsystem, wherein the first decisioning subsystem and the second decisioning subsystem are selected from among a plurality of decisioning subsystems managed by a plurality of buyers, and wherein the first decisioning subsystem and the second decisioning subsystem are selected according to the restriction information;
   submitting, by the transaction management computing subsystem, the first bid request to the first decisioning subsystem and the second bid request to the second decisioning subsystem;
   receiving, by the transaction management computing subsystem, a return bid message generated by a respective processor of one or more of the first decisioning subsystem and the second decisioning subsystem resulting in at least one return bid message;
   determining, by the transaction management computing subsystem, according to the at least one return bid message, a winning bid; and
   submitting, by the transaction management computing subsystem, according to the at least one return bid message, the winning bid to the web server, wherein the web server provides ad data to the web browser according to the winning bid, enabling the web browser to obtain one or more advertisements for presentation in the one or more ad spaces of the web page.

2. The method of claim 1, wherein the method further comprises:
   detecting, by the transaction management computing subsystem, the user ID that is included in the browser header;
   retrieving, by the transaction management computing subsystem, the data from the user data store according to the user ID;
   obtaining, by the transaction management computing subsystem, the ad tag associated with the page request; and
   obtaining, by the transaction management computing subsystem, the restriction information from the ad tag.

3. The method of claim 1, wherein the user ID comprises a platform-specific user ID, wherein the winning bid includes a location for obtaining the one or more advertisements, and wherein the location comprises a uniform resource locator.

4. The method of claim 1, further comprising counting, by the transaction management computing subsystem, the one or more advertisements provided to the web browser.

5. The method of claim 1, wherein each of the first decisioning subsystem and the second decisioning subsystem initiates an internal auction between a respective plurality of buyer subsystems.

6. The method of claim 1, wherein the determining the winning bid comprises comparing the at least one return bid message to one or more metrics to determine the winning bid.

7. The method of claim 1, wherein return information included in the at least one return bid message is utilized to determine the winning bid, and wherein the return information is associated with a metric other than a price.

8. The method of claim 1, wherein the ad data includes a uniform resource locator indicating a location to enable the web browser to communicate with the transaction management computing subsystem.

9. The method of claim 1, wherein the ad data includes a first uniform resource locator to enable the transaction management computing subsystem to track a frequency of advertisements supplied to the web browser, and wherein the ad data further includes a second uniform resource locator indicating a location to enable the web browser to obtain the one or more advertisements.

10. The method of claim 1, wherein the restriction information indicates at least one restriction on sharing the data retrieved from the user data store with one or more of the first decisioning subsystem and the second decisioning subsystem.

11. A transaction management computing subsystem, comprising:
   a processor; and
   a memory that stores executable instructions that, when executed by the processor, facilitate performance of operations comprising:
      generating, according to restriction information, a plurality of bid requests, wherein the restriction information is obtained from an ad tag associated with a request included in a message received from a server, wherein the plurality of bid requests include at least a portion of data associated with a user that is retrieved from a user data store, wherein the data is retrieved from the user data store according to a user identification (ID), wherein the user ID is included in a header, wherein the header is obtained from information associated with the request that is included in the message received from the server, and wherein the message corresponds to an ad call, wherein the plurality of bid requests further characterize one or more ad spaces of a software application associated with the request that is included in the message received from the server, wherein a first bid request of the plurality of bid requests comprises first characterizing information of the user, wherein a second bid request of the plurality of bid requests comprises second characterizing information of the user, and wherein the first characterizing information is different from the second characterizing information;

selecting at least a first decisioning subsystem and a second decisioning subsystem, wherein the first decisioning subsystem and the second decisioning subsystem are selected from among a plurality of decisioning subsystems managed by a plurality of buyers, and wherein the first decisioning subsystem and the second decisioning subsystem are selected according to the restriction information;

submitting the first bid request to the first decisioning subsystem and the second bid request to the second decisioning subsystem;

receiving a return bid message generated by a respective processor of one or more of the first decisioning subsystem and the second decisioning subsystem resulting in at least one return bid message; and submitting, according to the at least one return bid message, a winning bid to the server, wherein the winning bid includes ad data enabling presentation of one or more advertisements in the one or more ad spaces.

12. The transaction management computing subsystem of claim 11, wherein the software application comprises a web-enabled video game.

13. The transaction management computing subsystem of claim 11, wherein the software application comprises a web browser, and wherein the user data store comprises a section of a client-side data store associated with the web browser.

14. The transaction management computing subsystem of claim 11, wherein the operations further comprise:
  detecting the user ID that is included in the header;
  retrieving the data that is associated with the user from the user data store according to the user ID;
  obtaining the ad tag associated with the request; and
  obtaining the restriction information from the ad tag.

15. The transaction management computing subsystem of claim 11, wherein the user ID comprises a platform-specific user ID, wherein the winning bid includes a location for obtaining the one or more advertisements, and wherein the location comprises a uniform resource locator.

16. The transaction management computing subsystem of claim 11, wherein the winning bid is determined by comparing the at least one return bid message to one or more metrics to determine the winning bid.

17. A non-transitory machine-readable medium comprising executable instructions that, when executed by a transaction management computing subsystem including a processor, facilitate performance of operations, the operations comprising:
  generating, according to ad tag information obtained from an ad tag that is associated with a software application, a plurality of bid requests, wherein the plurality of bid requests include at least a portion of data associated with a user that is retrieved according to a user identification (ID), wherein the user ID is included in a header that is obtained from request information associated with a request, wherein the request information is included in an ad call, wherein the ad call is received from the software application, wherein the plurality of bid requests further characterize one or more ad spaces associated with the request, wherein a first bid request of the plurality of bid requests comprises first characterizing information of the user, wherein the first characterizing information includes first information that had been provided by a first buyer of a plurality of buyers, wherein a second bid request of the plurality of bid requests comprises second characterizing information of the user, wherein the second characterizing information includes second information that had been provided by a second buyer of the plurality of buyers, and wherein the first characterizing information is different from the second characterizing information;
  submitting the first bid request to a selected first decisioning subsystem, of a plurality of decisioning subsystems, that is managed by the first buyer;
  submitting the second bid request to a selected second decisioning subsystem, of the plurality of decisioning subsystems, that is managed by the second buyer;
  receiving a return bid message generated by a respective processor of one or more of the first decisioning subsystem and the second decisioning subsystem resulting in at least one return bid message; and
  submitting, according to the at least one return bid message, a winning bid to the software application, wherein the winning bid includes ad data that enables the software application to obtain one or more advertisements for presentation in the one or more ad spaces.

18. The non-transitory machine-readable medium of claim 17, wherein the software application comprises a web-enabled video game or a web browser.

19. The non-transitory machine-readable medium of claim 17, wherein the operations further comprise:
  detecting the user ID that is included in the header;
  retrieving the data that is associated with the user according to the user ID;
  obtaining the ad tag associated with the software application; and
  obtaining the ad tag information from the ad tag.

20. The non-transitory machine-readable medium of claim 17, wherein the user ID comprises a platform-specific user ID, wherein the winning bid includes a location for obtaining the one or more advertisements, and wherein the location comprises a uniform resource locator.

* * * * *